United States Patent
Uchibori et al.

(10) Patent No.: US 8,120,873 B2
(45) Date of Patent: Feb. 21, 2012

(54) SPINDLE MOTOR AND DISK DRIVE APPARATUS PROVIDED WITH THE SPINDLE MOTOR

(75) Inventors: Tomoki Uchibori, Kyoto (JP); Taishi Sakaguchi, Kyoto (JP); Yujiro Kato, Kyoto (JP); Takuro Iguchi, Kyoto (JP); Tadashi Hasegawa, Kyoto (JP); Taku Nakajima, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/039,413

(22) Filed: Mar. 3, 2011

(65) Prior Publication Data
US 2011/0216442 A1 Sep. 8, 2011

(30) Foreign Application Priority Data

Mar. 5, 2010 (JP) ................................ 2010-049460
Jan. 17, 2011 (JP) ................................ 2011-006850

(51) Int. Cl.
*G11B 17/02* (2006.01)
(52) U.S. Cl. .................................................. 360/99.08
(58) Field of Classification Search ................. 33/99.08
See application file for complete search history.

(56) References Cited

U.S. PATENT DOCUMENTS

| 6,081,057 | A * | 6/2000 | Tanaka et al. | 310/90 |
| 6,369,981 | B2 * | 4/2002 | Nii et al. | 360/99.08 |
| 6,445,096 | B1 * | 9/2002 | Saito et al. | 310/67 R |
| 6,455,961 | B1 * | 9/2002 | Higuchi | 310/67 R |
| 6,483,214 | B1 * | 11/2002 | Oelsch | 310/68 R |
| 6,512,316 | B2 * | 1/2003 | Obara et al. | 310/90 |

FOREIGN PATENT DOCUMENTS

JP 2005-057892 3/2005

* cited by examiner

*Primary Examiner* — Mark Blouin
(74) *Attorney, Agent, or Firm* — Keating & Bennett, LLP

(57) ABSTRACT

A spindle motor includes a rotary unit, a bearing mechanism, a stator, a base member, and a connector connected to a leader line extending from the stator through a communication hole of the base member. The connector includes a pedestal and a metal pin. The leader line is connected to a first pin terminal of the metal pin on a hole-positioning lower surface of a hole-defining portion of the pedestal. An upper surface of the metal pin is separated from the pedestal at a specified separation position between the first pin terminal and a second pin terminal. A connection position of the first pin terminal and the leader line on the hole-positioning lower surface is covered with an adhesive agent. The periphery of a gap between the metal pin and the pedestal over an extent from the first pin terminal to the separation position is sealed by the adhesive agent.

12 Claims, 31 Drawing Sheets

A – A

B — B

C – C

SPINDLE MOTOR AND DISK DRIVE APPARATUS PROVIDED WITH THE SPINDLE MOTOR

BACKGROUND OF THE INVENTION

1. Field of the Invention

The present invention relates to an electric motor.

2. Description of the Related Art

Conventionally, a connector for interconnecting a stator and a circuit board is arranged outside a base member in a motor for a hard disk drive apparatus. Japanese Patent Application Publication No. 2005-57892 discloses a connector for a spindle motor which includes an insulating boss portion and a recess portion. The insulating boss portion is press-fitted to the wire leading hole of a base plate. The recess portion is defined on the contact surface that makes contact with the base plate. When the connector is attached to the base plate, electric wires leading from the wire leading hole are inserted through a communication hole defined in the insulating boss portion. The insulating boss portion is press-fitted to the wire leading hole. The electric wires are soldered to the junction portions of electrodes provided on the connector. An adhesive agent is injected into the recess portion of the connector through an injection hole extending through the connector, thereby bonding the connector and the base plate together. The adhesive agent is also applied on the junction portions and the communication hole of the connector. With the method disclosed in Japanese Patent Application Publication No. 2005-57892, it is possible to successively apply the adhesive agent on the respective portions of the connector.

In case of using a connector in which metal pins are fixed to a resin-made pedestal, it is likely that, even if the connection positions of the leader lines of the stator and the metal pins are sealed by an adhesive agent, a gas existing in the communication hole of the base member may flow into and out of a hard disk drive apparatus through a minute gap between the metal pins and the pedestal.

SUMMARY OF THE INVENTION

In accordance with a first embodiment of the invention, there is provided a spindle motor for use in a disk drive apparatus, including: a rotary unit including rotor magnets; a bearing mechanism arranged to rotatably support the rotary unit about a vertically-extending center axis; a stator arranged in an opposing relationship with the rotor magnets to generate torque; a base member positioned below the stator; and a connector fixed to a lower surface of the base member and connected to a leader line extending from the stator through a communication hole of the base member, wherein the connector includes a resin-made pedestal fixed to the lower surface of the base member and a metal pin attached to the pedestal, the pedestal including a hole-defining portion with at least one through-hole into which the leader line is inserted, the hole-defining portion including a hole-positioning lower surface, the leader line being connected to a first pin terminal of the metal pin on the hole-positioning lower surface, an upper surface of the metal pin being separated from the pedestal at a specified separation position between the first pin terminal and a second pin terminal, a connection position of the first pin terminal and the leader line on the hole-positioning lower surface being covered with an adhesive agent, the periphery of a gap between the metal pin and the pedestal over an extent from the first pin terminal to the separation position being sealed by the adhesive agent except the periphery of the through-hole of the hole-defining portion.

With such configuration, it is possible to prevent a gas from flowing through between the metal pin and the pedestal.

The above and other features, elements, steps, characteristics and advantages of the present invention will become more apparent from the following description of preferred embodiments of the present invention with reference to the attached drawings.

DETAILED DESCRIPTION OF THE INVENTION

Hereinafter, preferred embodiments of the present invention will be described with reference to the accompanying drawings. Note that the upper and the lower sides in the direction of a center axis J1 will be just referred to as "upper" and "lower", respectively. However, these definitions are not intended to limit the positional relationship and direction of the present spindle motor and the present disk drive apparatus when built in actual devices.

Figure 1:
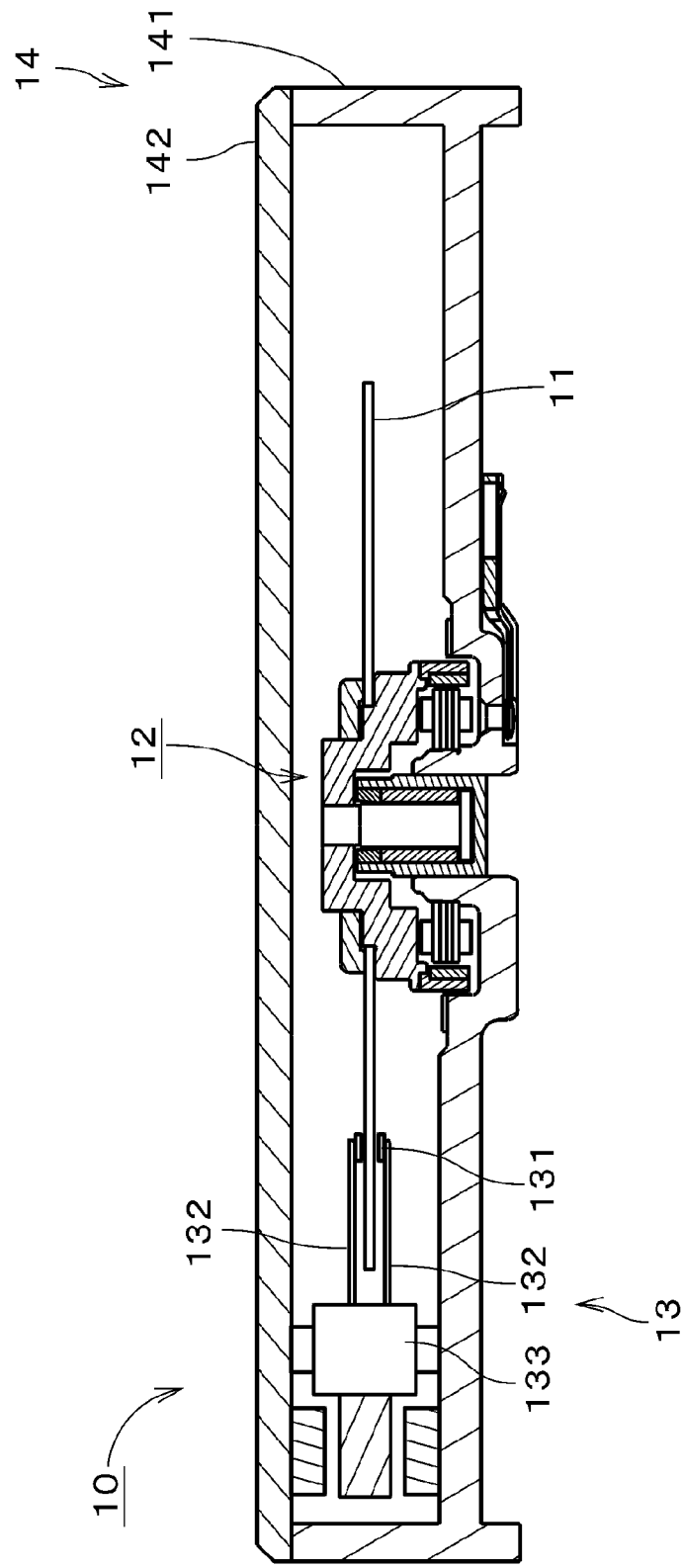
FIG. 1 is a schematic view showing a disk drive apparatus according to a first preferred embodiment.

FIG. 1 is a schematic sectional view showing a disk drive apparatus 10 provided with a spindle motor (hereinafter just referred to as "motor") according to a first preferred embodiment of the present invention. The disk drive apparatus 10 is preferably a so-called hard disk drive. The disk drive apparatus 10 preferably includes a disk 11, a motor 12, an access unit 13 and a housing 14. The motor 12 preferably rotates while holding the information-recording disk 11. The access unit 13 preferably performs at least one of information reading and recording tasks with respect to the disk 11.

The housing 14 preferably includes a first open-top box-shaped housing member 141 and a second flat housing member 142. The motor 12 and the access unit 13 are preferably arranged within the first housing member 141. In the disk drive apparatus 10, the housing 14 is preferably defined by coupling the second housing member 142 to the first housing member 141. The internal space of the disk drive apparatus 10 is preferably maintained as a clean space in which dirt is extremely rare.

The access unit 13 preferably includes a head 131, two arms 132 and a head moving mechanism 133. The head 131 preferably moves toward the disk 11 and performs at least one of information reading and recording tasks. Each of the arms 132 preferably supports the head 131. The head moving mechanism 133 preferably causes movement of the head 131 relative to the disk 11 by displacing each of the arms 132. Then, the head 131 preferably gains access to a desired position of the disk 11 while kept in close proximity to the rotating disk 11.

Figure 2:
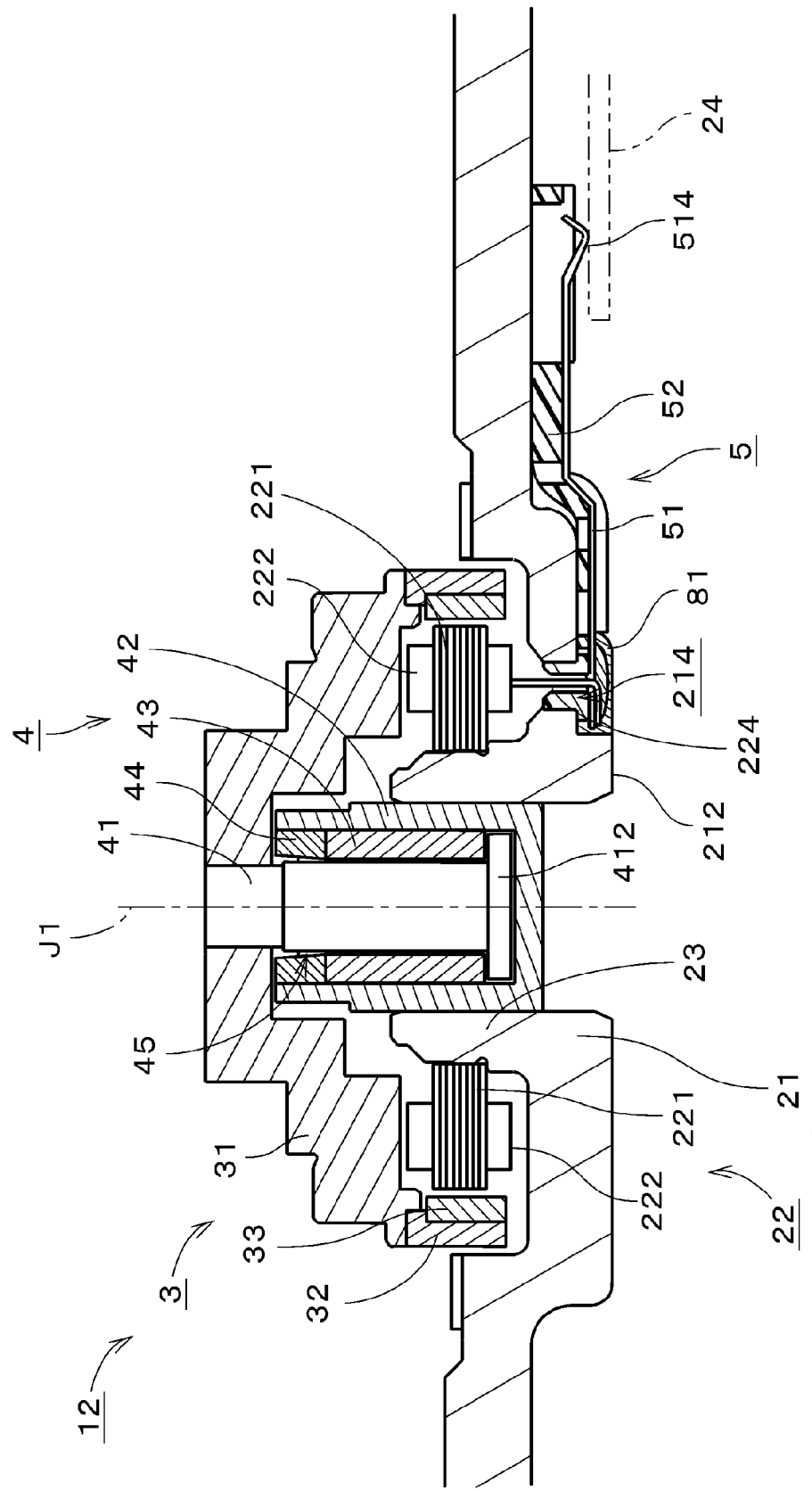
FIG. 2 is a schematic sectional view showing a motor.

FIG. 2 is a schematic sectional view of the motor 12. The motor 12 is preferably of an outer rotor type. The motor 12 preferably includes a stationary unit 2 as a fixed assembly, a rotary unit 3 as a rotating assembly and a fluid dynamic pressure bearing mechanism 4 (hereinafter referred to as "bearing mechanism 4"). The rotary unit 3 is preferably supported on the stationary unit 2 through the bearing mechanism 4 so that it can rotate about the center axis J1 of the motor 12 with respect to the stationary unit 2.

The stationary unit 2 preferably includes a substantially flat base member 21, a stator 22, a cylindrical holder 23 and a connector 5. The base member 21 and the holder 23 are preferably integrally arranged with the first housing member 141 shown in FIG. 1. The base member 21 preferably includes a communication hole 214 extending in a direction substantially parallel or parallel to the center axis J1. The stator 22 is preferably arranged above the base member 21 and fixed to the outer surface of the holder 23. The stator 22 preferably includes a stator core 221 and a plurality of coils 222 wound around the stator core 221. The bearing mechanism 4 is preferably fixed inside the holder 23. The connector 5 preferably includes metal pins 51 and a pedestal 52. The pedestal 52 is preferably formed by injection-molding a resin, for example. In the connector 5, the pedestal 52 is preferably fixed to the lower surface of the base member 21. Leader lines 224 leading from the stator 22 are preferably connected to the metal pins 51 through the communication hole 214. The metal pins 51 are preferably connected to a circuit board 24 indicated by a double-dot chain line in FIG. 2. Accordingly, the stator 22 and the circuit board 24 are electrically connected to each other.

The rotary unit 3 preferably includes an annular rotor hub 31, a cylindrical yoke 32 and rotor magnets 33. The yoke 32 is preferably arranged below the radial outer end of the rotor hub 31 about the center axis J1. The rotor magnets 33 are preferably fixed to the inner surface of the yoke 32. In the following description of preferred embodiments of the present invention, the radial direction about the center axis J1 will be just referred to as "radial". The rotor magnets 33 preferably are radially opposed to the stator 22. Torque is generated between the rotor magnets 33 and the stator 22.

The bearing mechanism 4 preferably includes a shaft 41, a substantially cylindrical closed-bottom bush 42, a sleeve 43 and a seal cap 44. The lower portion of the bush 42 is preferably fixed to the inner surface of the holder 23. The sleeve 43 is preferably fixed to the inner surface of the cylinder portion of the bush 42. The shaft 41 is preferably inserted into the sleeve 43. A thrust plate 412 including an annular shape is preferably arranged below the shaft 41. The seal cap 44 is preferably arranged inside the bush 42 and above the sleeve 43.

In the motor 12, a lubricant 45 is preferably filled in the gaps defined between the sleeve 43, the inner portion of the bush 42, the shaft 41 and the thrust plate 412. In the motor 12, the bearing mechanism 4 preferably supports the rotary unit 3 fixed to the shaft 41 through the lubricant 45 without a direct contact therebetween. This makes it possible to rotate the rotary unit 3 and the disk 11 shown in FIG. 1.

Figure 3:
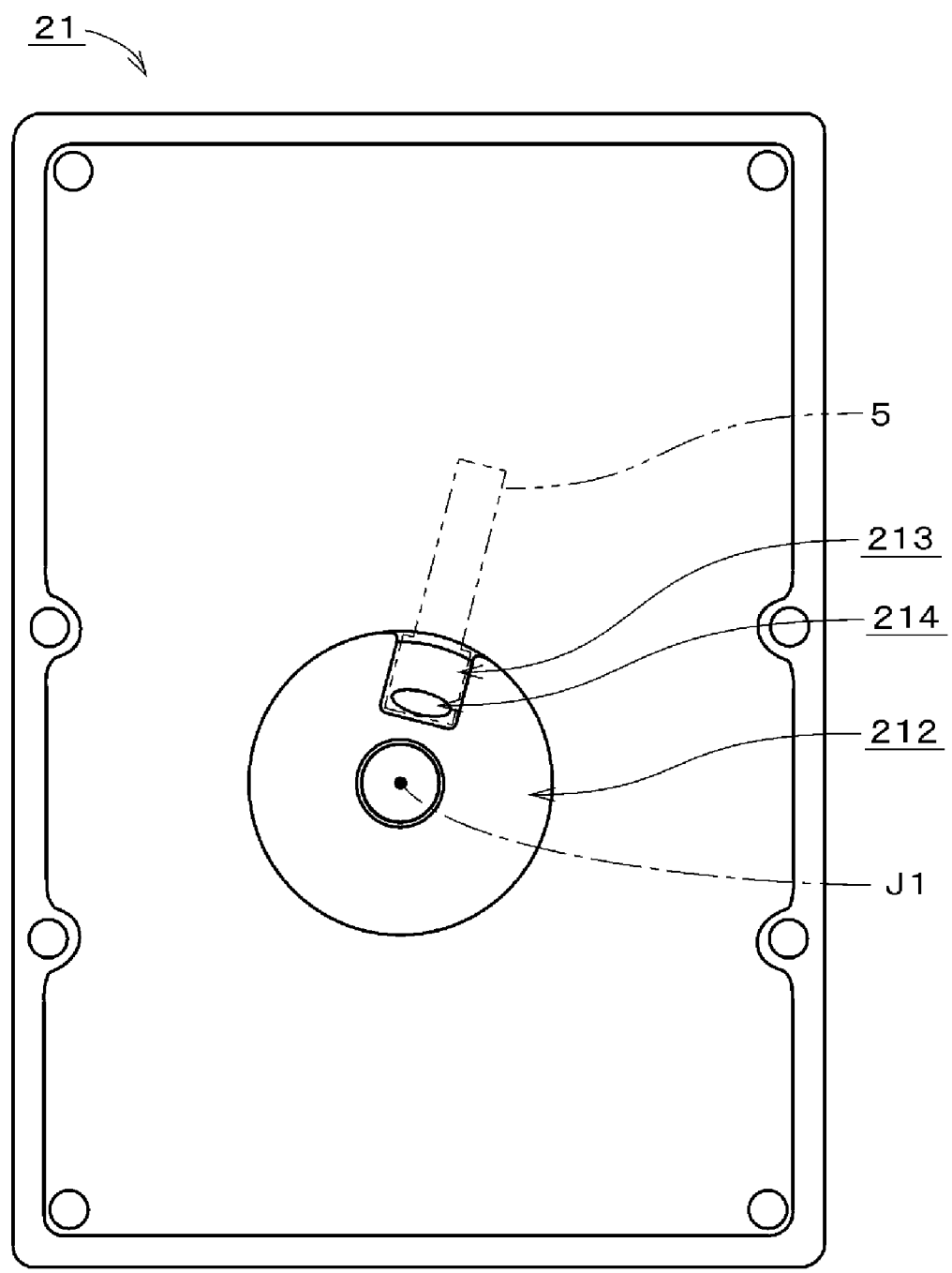
FIG. 3 is a schematic bottom view showing a base member.

FIG. 3 is a schematic bottom view of the base member 21 with the connector 5 indicated by a double-dot chain line. The lower surface of the base member 21 preferably includes a substantially annular central area 212. The vertically-extending center axis J1 is preferably positioned at the center of the central area 212. The central area 212 preferably protrudes downwards beyond the peripheral area, namely in the front direction of the paper plane in FIG. 3. The central area 212 preferably includes a cutout-shaped radially-extending recess portion 213. The recess portion 213 preferably includes the communication hole 214.

The width of the connector 5 in the direction perpendicular to the extension direction of the connector 5 but substantially parallel or parallel to the central area 212 of the base member 21 (hereinafter referred to as "transverse direction") is slightly smaller than the width of the recess portion 213 in the same direction. The end portion of the connector 5 closer to the center axis J1 is inserted into the recess portion 213.

Figure 4:
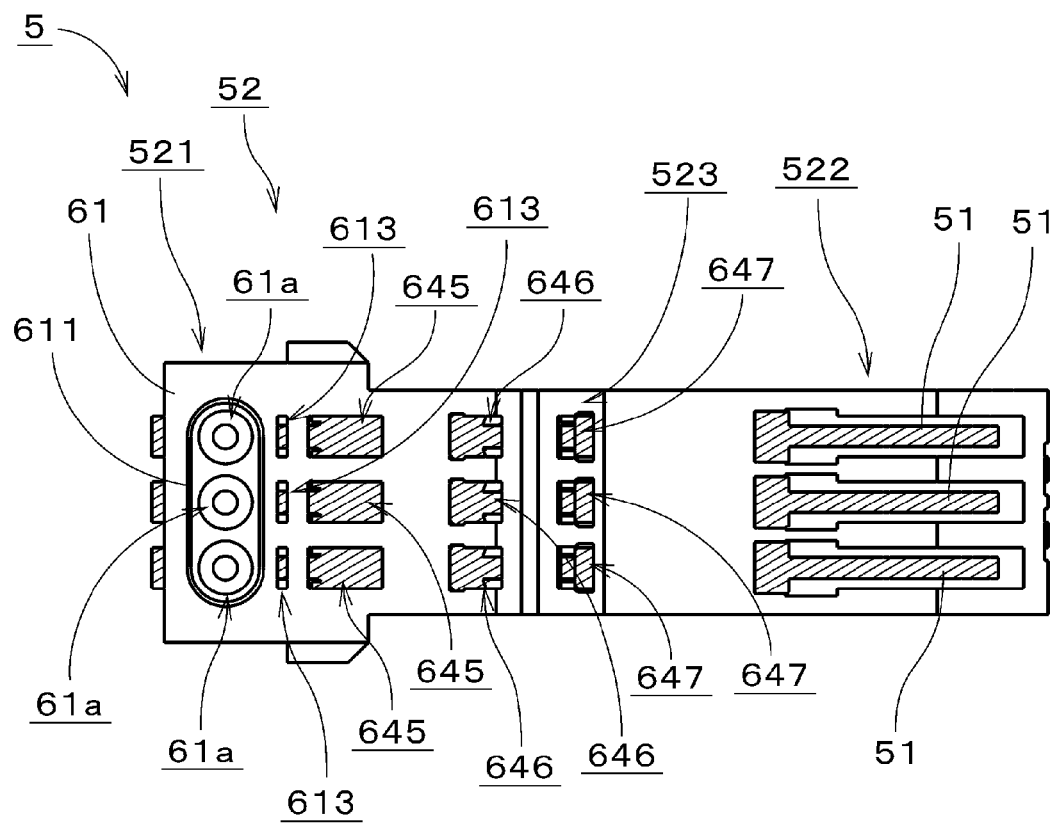
FIG. 4 is a schematic plan view showing a connector.
Figure 5:
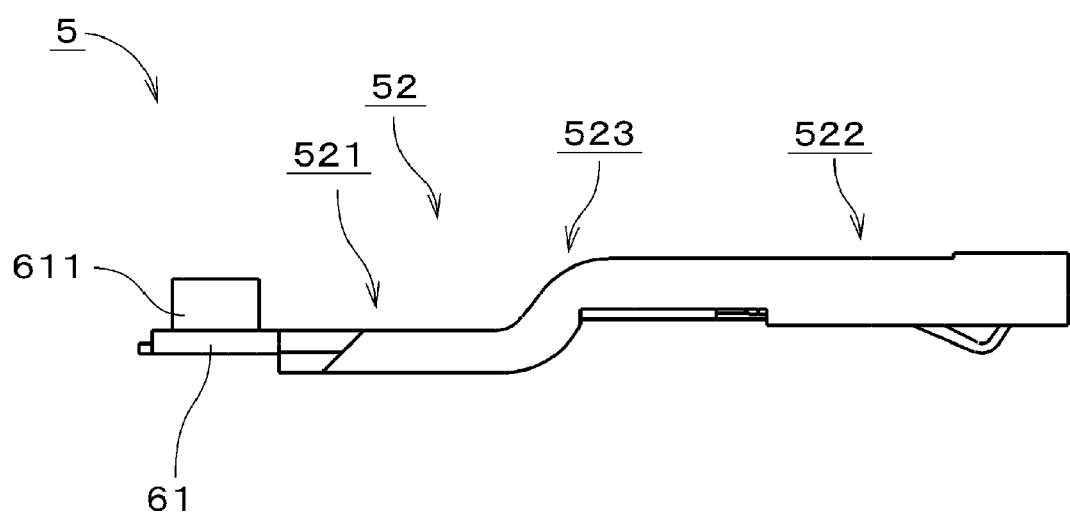
FIG. 5 is a schematic side view of the connector.

FIGS. 4 and 5 are schematic plan view and side view of the connector 5, respectively. The metal pins 51 are hatched in FIG. 4. This holds true for FIGS. 6 and 7. The pedestal 52 preferably includes a first flat portion 521, a second flat portion 522 and a step portion 523 positioned between the first and second flat portions 521 and 522. The second flat portion 522 is preferably positioned above the first flat portion 521. The first flat portion 521 is preferably greater in width than the second flat portion 522.

The first flat portion 521 preferably includes a tip end portion 61 and a protrusion portion 611 protruding upwards from the tip end portion 61. As shown in FIG. 4, the protrusion portion 611 preferably includes three through-holes 61a extending vertically through the tip end portion 61 along the extension direction of the protrusion portion 611. In the following description, the tip end portion 61 will be referred to as "hole-defining portion 61". The hole-defining portion 61 preferably includes three minute through-holes 613 arranged side by side in the transverse direction at an equal interval. The through-holes 613 are preferably positioned nearer to the second flat portion 522 than the protrusion portion 611. As will be described below, the through-holes 613 are preferably used in sealing the gaps between the pedestal 52 and the metal pins 51. In the following description, the through-holes 613 will be referred to as "sealing through-holes 613".

Figure 6:
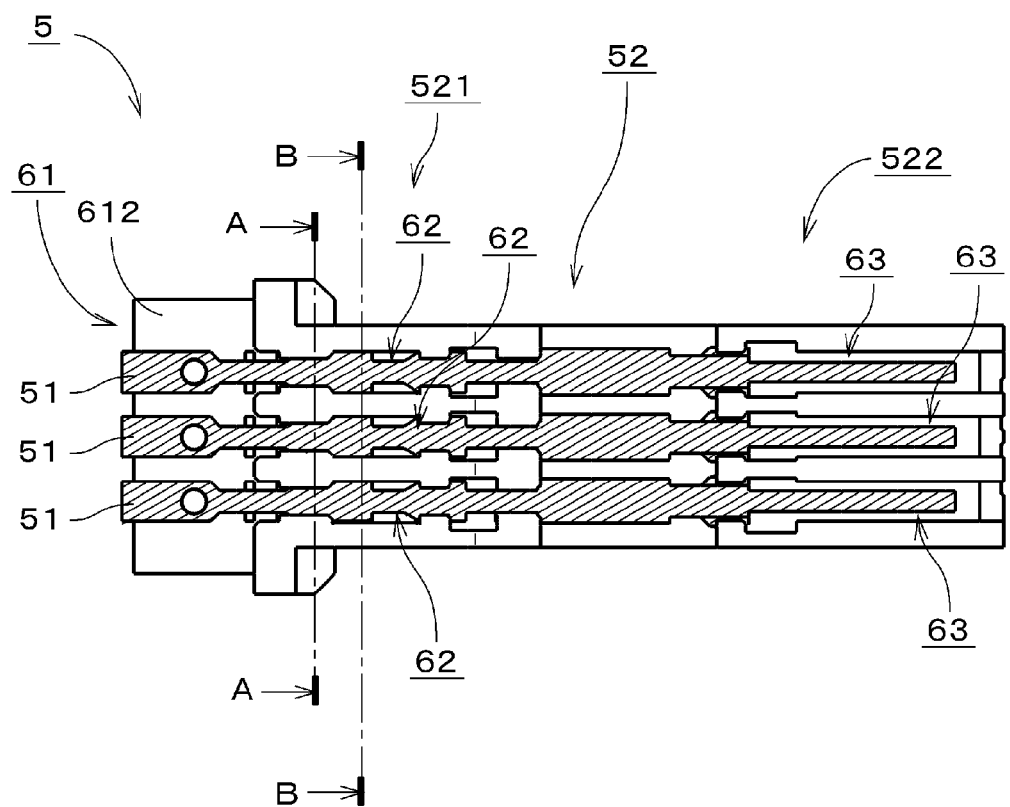
FIG. 6 is a schematic bottom view of the connector.
Figure 7:
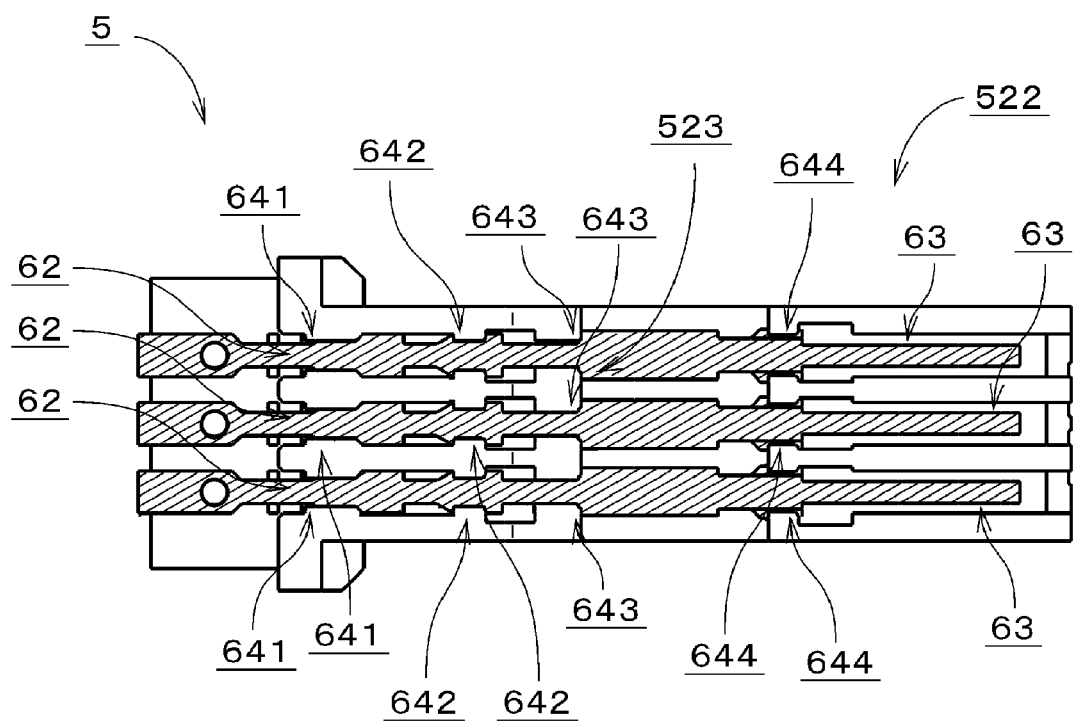
FIG. 7 is another schematic bottom view of the connector.

FIGS. 6 and 7 are schematic bottom views of the connector 5. In the connector 5, the pedestal 52 is first molded and then the metal pins 51 are attached to the pedestal 52. As shown in FIG. 6, a large portion of the lower surface of each of the metal pins 51 is preferably exposed downwards in a state that the metal pins 51 are fixed to the pedestal 52. The lower surface of the first flat portion 521 preferably includes three groove portions arranged in a parallel manner with respect to the extension direction of the connector 5, namely the extension direction of the metal pins 51. The groove portions 62 are preferably positioned nearer to the second flat portion 522 than the lower surface 612 of the hole-defining portion 61. In the following description, the lower surface 612 of the hole-defining portion 61 will be referred to as "hole-positioning lower surface 612". The hole-positioning lower surface 612 preferably includes a substantially planar surface. The hole-positioning lower surface 612 and the lower surfaces of the groove portions 62 preferably extend continuously. The end section of the second flat portion 522 preferably includes three slits 63 extending substantially parallel to the extension direction of the connector 5.

Figure 8:
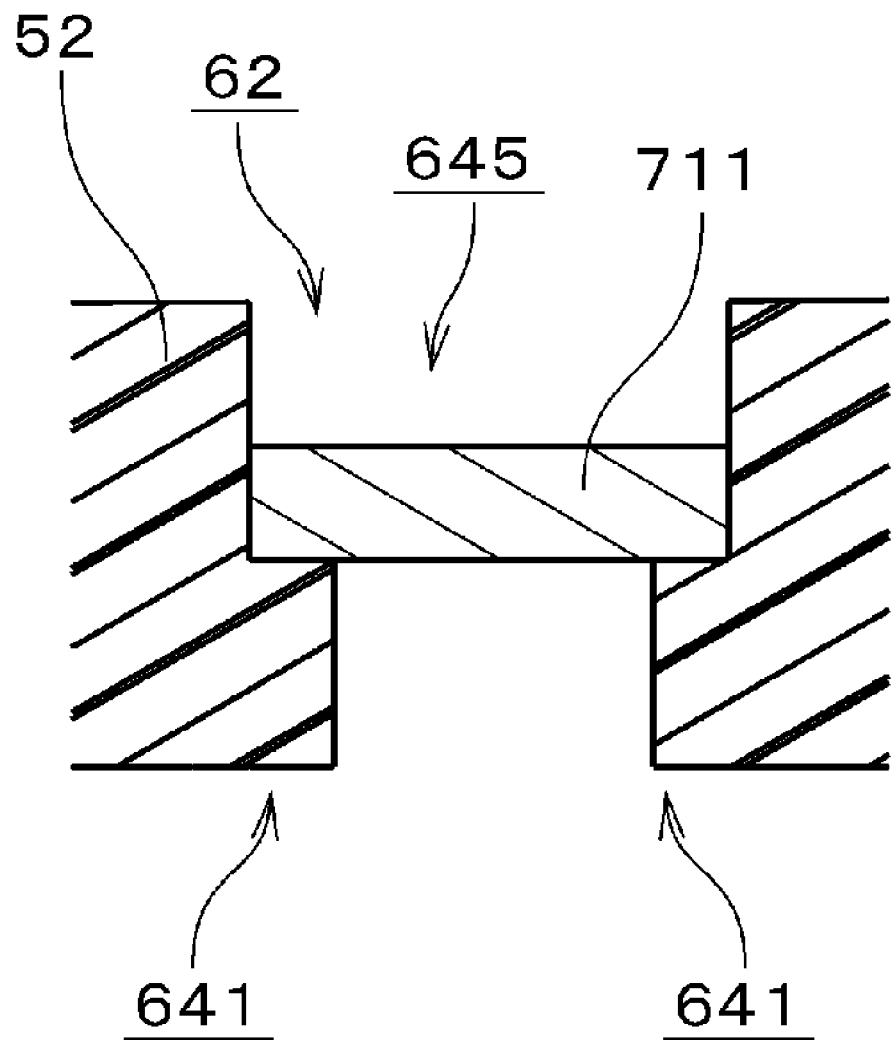
FIG. 8 is a schematic sectional view of the connector.

FIG. 8 is a schematic sectional view of the groove portions 62 of the connector 5 taken along line A-A in FIG. 6. Only one of the groove portions 62 is shown in FIG. 8. Each of the groove portions 62 preferably includes a through-hole 645. As can be seen in FIG. 4, the through-holes 645 of the groove portions 62 are preferably positioned nearer to the other ends of the metal pins 51 making contact with the circuit board 24 than the sealing through-holes 613. Referring again to FIG. 8, the lower portion of each of the through-holes 645 preferably includes a pair of first prop portions 641 protruding toward the center of each of the groove portions 62 along the transverse direction. The spatial area above the first prop portions 641 may be regarded as each of the through-hole 645. During the injection-molding process of the pedestal 52, each of the raised portions of a mold is arranged in a position corresponding to each of the through-holes 645 so that the first prop portions 641 can be formed in the spaces defined at the opposite lateral sides of each of the raised portions. In this manner, the through-holes 645 are formed as marks of the prop-forming raised portions of a mold. In the following description, the through-holes 645 will be referred to as "propping through-holes 645". As can be seen in FIG. 4, the length of the sealing through-holes 613 in the extension direction of the metal pins 51 is smaller than the length of the propping through-holes 645 in the same direction.

Figure 9:
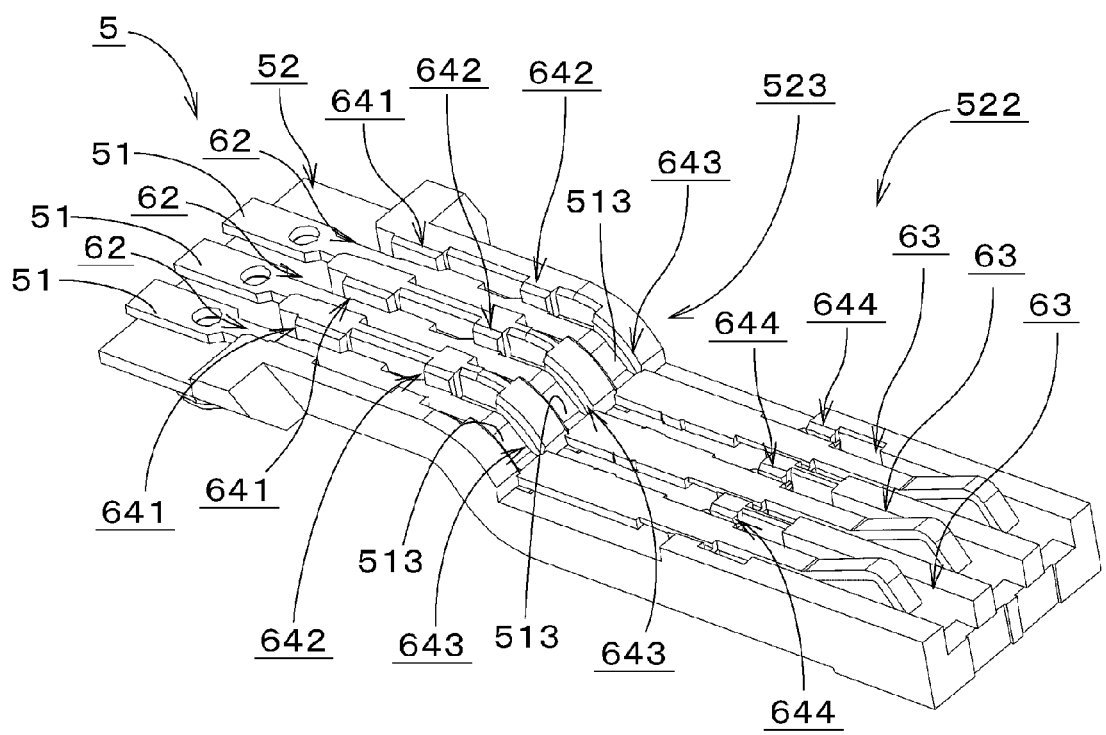
FIG. 9 is a schematic perspective view of the connector.

FIG. 9 is a schematic bottom perspective view of the connector 5. As shown in FIGS. 7 and 9, each of the groove portions 62 preferably includes second and third prop portions 642 and 643 protruding toward the center of each of the groove portions 62. The second and third prop portions 642 and 643 are preferably positioned nearer to the second flat portion 522 than the first prop portions 641. Each of the slits 63 preferably includes fourth prop portions 644 protruding toward the center of each of the slits 63 along the transverse direction. Similarly to the first prop portions 641, the second and third prop portions 642 and 643 are arranged within the propping through-holes 646 and 647 as shown in FIG. 4.

Figure 10:
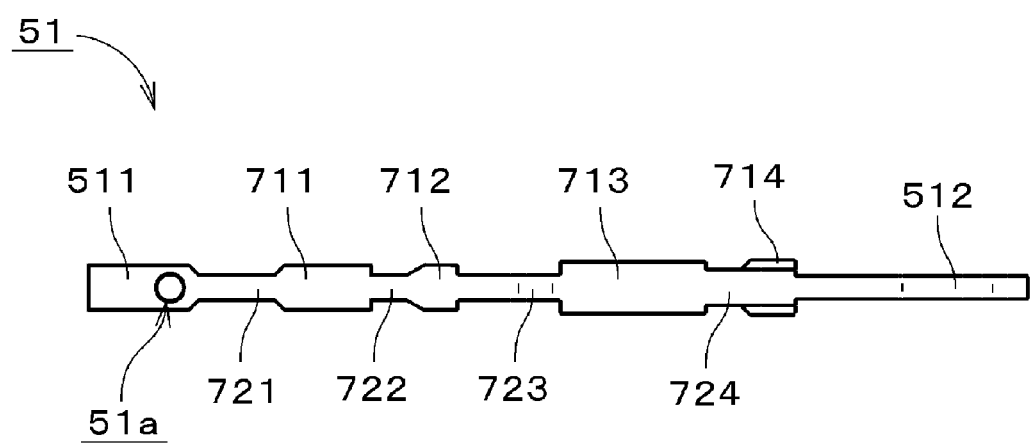
FIG. 10 is a schematic plan view showing a metal pin.
Figure 11:
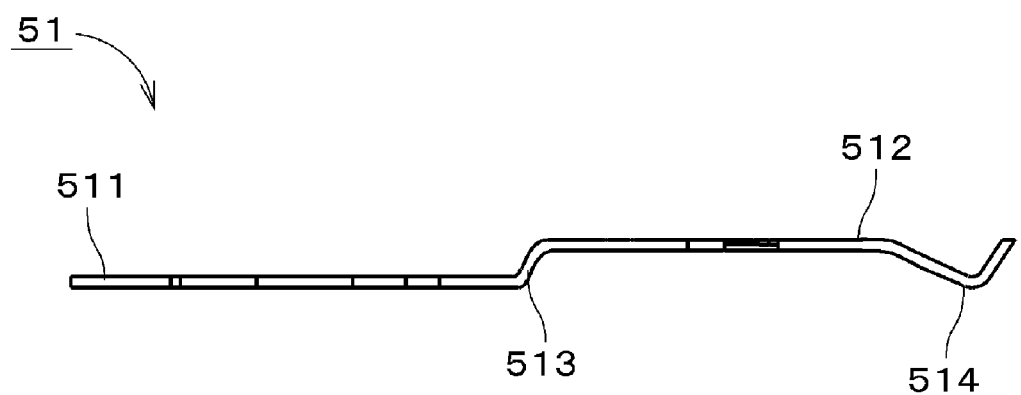
FIG. 11 is a schematic side view of the metal pin.

FIGS. 10 and 11 are schematic plan and side views showing one of the metal pins 51. Each of the metal pins 51 preferably includes a first connection terminal 511 and a second connection terminal 512. The first connection terminal 511 is substantially perpendicular to the center axis J1 shown in FIG. 2. Each of the metal pins 51 is defined by bending a strip-like metal member with planar upper and lower surfaces. As shown in FIG. 10, the first connection terminal 511 preferably includes a hole portion 51a. As shown in FIG. 11, each of the metal pins 51 preferably includes a step portion 513 at its middle extension. The first connection terminal 511 is preferably positioned lower than the second connection terminal 512. The second connection terminal 512 preferably includes a crooked portion 514 crooking downwards. As shown in FIG. 2, the crooked portion 514 is electrically connected to the circuit board 24.

Referring to FIG. 10, each of the metal pins 51 preferably includes four portions with increased transverse width, which are arranged between the first and second connection terminals 511 and 512. In the following description, the four portions will be referred to as "first through fourth increased width portions 711, 712, 713 and 714" in the order closest to the first connection terminal 511. Four portions with reduced width, which are positioned between the first connection terminal 511 and the first increased width portion 711, between the first increased width portion 711 and the second increased width portion 712, between the second increased width portion 712 and the third increased width portion 713 and between the third increased width portion 713 and the fourth increased width portion 714, will be referred to as "first through fourth reduced width portions 721, 722, 723 and 724" in the order closest to the first connection terminal 511.

Figure 12:
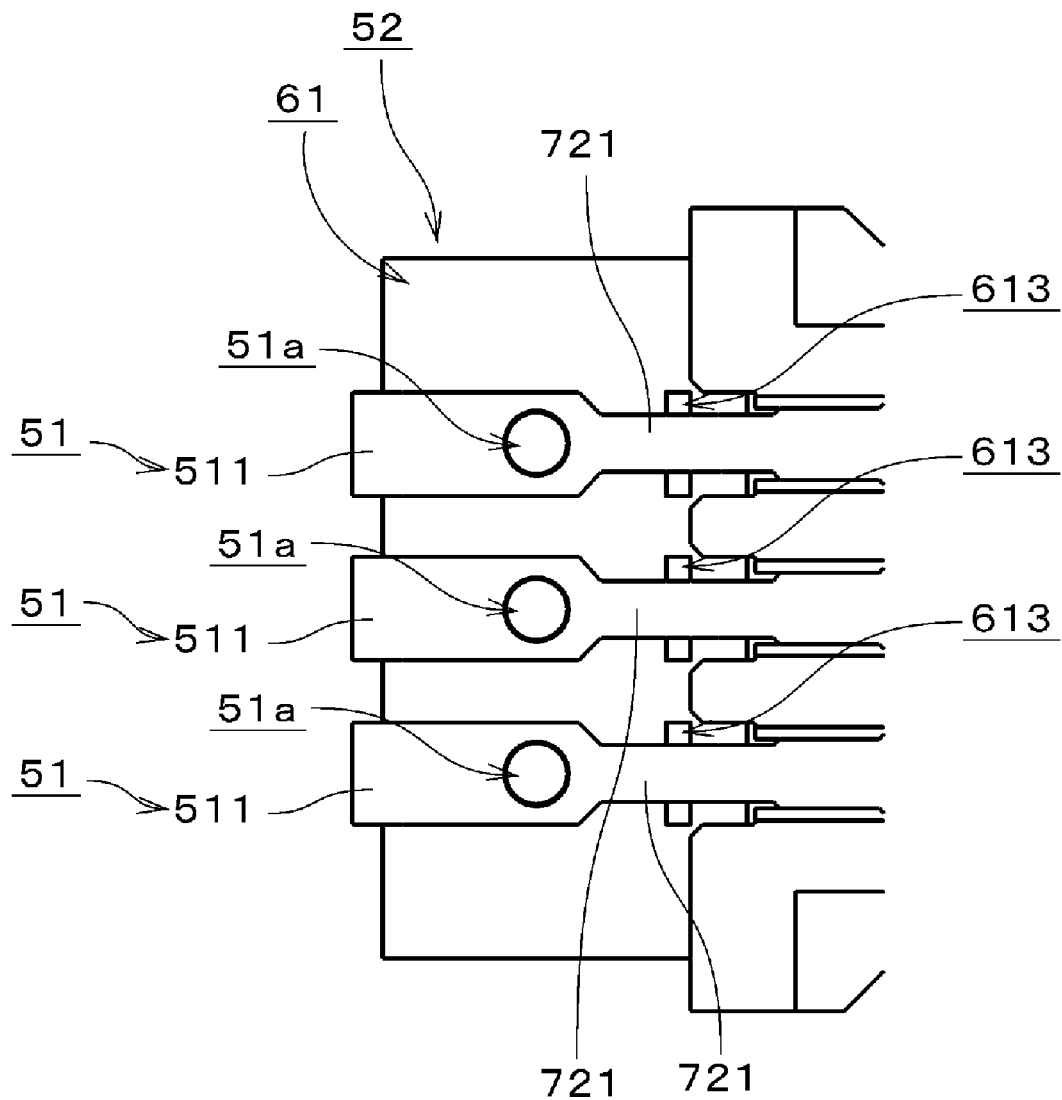
FIG. 12 is a schematic bottom view of the connector.

When the metal pins 51 are fixed to the pedestal 52 as shown in FIGS. 4 and 12, the hole portions 51a overlap with the through-holes 61a in the direction parallel to the center axis J1. The tip end portions of the first connection terminals 511 protrude slightly beyond the hole-defining portion 61 to the left in FIG. 12. The first reduced width portion 721 is preferably positioned above each of the sealing through-holes 613 of the hole-defining portion 61. The width of the sealing through-holes 613 in the transverse direction is preferably greater than the width of the first reduced width portion 721 in the same direction.

Figure 13:
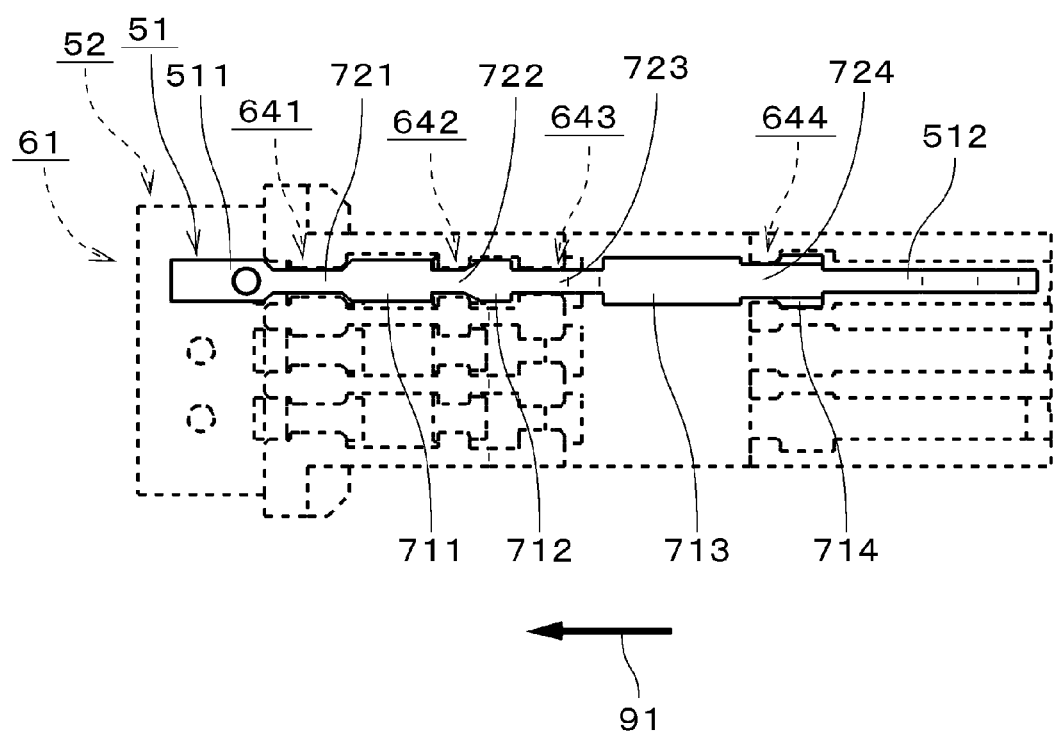
FIG. 13 is a schematic view showing the metal pin and the pedestal.

In order to fix the metal pins 51 to the pedestal 52, each of the metal pins 51 shown in FIG. 11 is preferably inserted toward the pedestal 52 in an upside-down state as illustrated in FIG. 13, for example. The first through fourth reduced width portions 721, 722, 723 and 724 are preferably positioned within the first through fourth prop portions 641, 642, 643 and 644 of the pedestal 52 indicated by dot lines.

Then, each of the metal pins 51 is preferably caused to slide toward the hole-defining portion 61 as indicated by an arrow 91 in FIG. 13. At this time, the first through fourth reduced width portions 721, 722, 723 and 724 are preferably fitted to the first through fourth prop portions 641, 642, 643 and 644.

The movement of each of the metal pins 51 is preferably stopped as the step portion 513 of each of the metal pins 51 comes into contact with the step portion 523 of the pedestal 52 as shown in FIG. 9. Referring to FIG. 8, the first increased width portion 711 is preferably partially positioned above the first prop portions 641. Similarly, the second through fourth increased width portions 712, 713 and 714 shown in FIG. 13 make contact with the second through fourth prop portions 642, 643 and 644 in the vertical direction as illustrated in FIG. 7.

Figure 14:
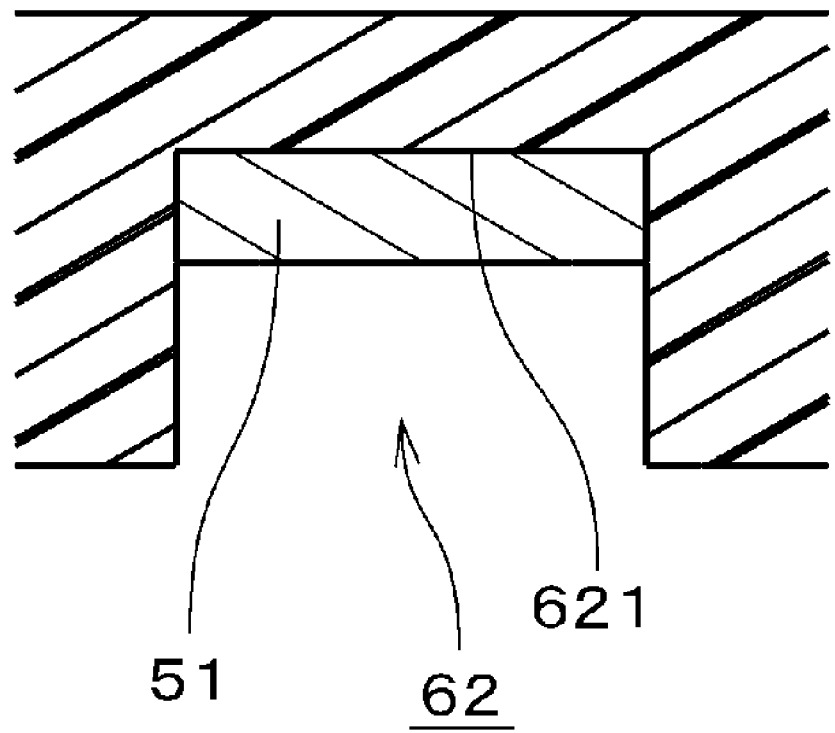
FIG. 14 is a schematic sectional view of the connector.

FIG. 14 is a schematic sectional view of each of the groove portions 62 taken along line B-B in FIG. 6. Only one of the groove portions 62 is shown in FIG. 14. The upper surface of each of the metal pins 51 preferably makes contact with the bottom surface 621 of each of the groove portions 62. The first through fourth prop portions 641, 642, 643 and 644 prevent each of the metal pins 51 from moving downwards in FIG. 2 from the bottom surface 621. In other words, the vertical position of each of the metal pins is preferably fixed as it is interposed between the bottom surface 621 of each of the groove portions 62 and the first through fourth prop portions 641, 642, 643 and 644 shown in FIG. 7. After the connector 5 is attached to the base member 21 as shown in FIG. 2, the metal pins 51 and the pedestal 52 are preferably covered with an adhesive agent 81. Therefore, even when a force is applied to the metal pins 51, there is no possibility that the metal pins 51 make sliding movement with respect to the pedestal 52.

Figure 15:
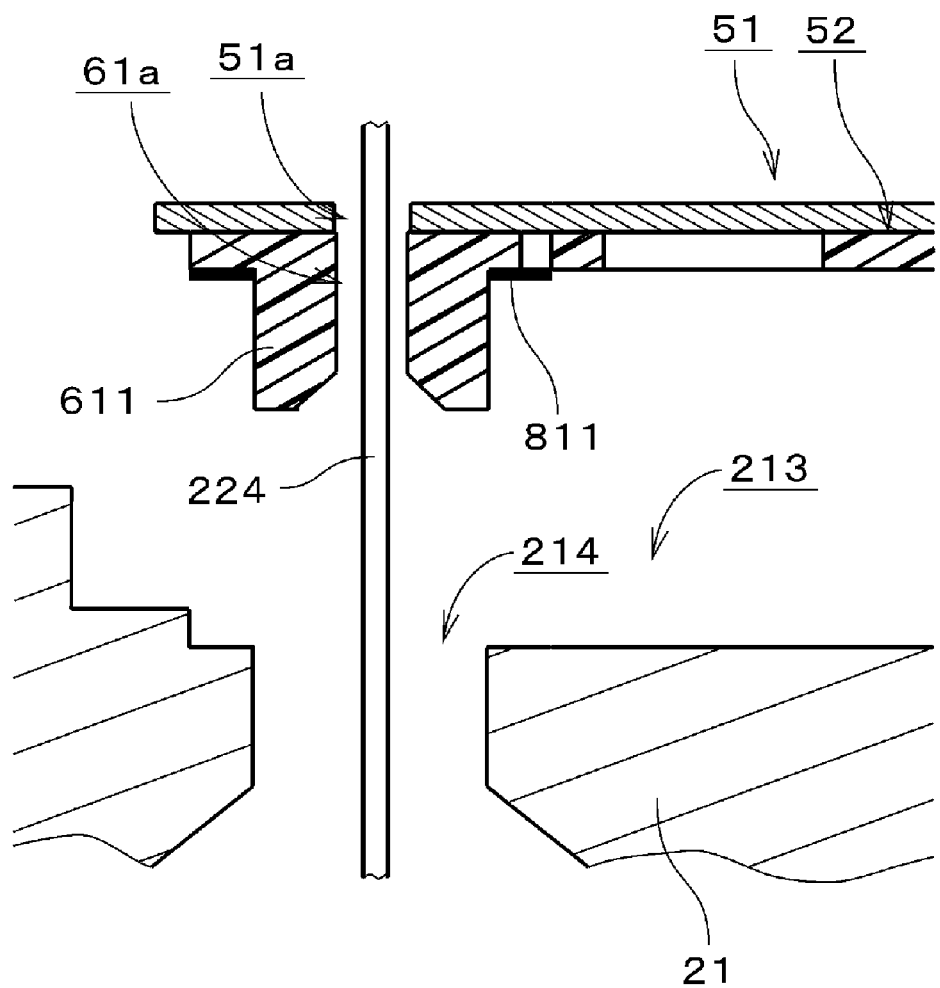
FIG. 15 is a schematic sectional view showing the connector and the base member.

Next, description will be made on the task of installing the connector 5 to the base member 21. First, three leader lines 224 leading from the stator 22 are preferably inserted through the communication hole 214 with the base member 21 kept in an upside-down state. Then, a thermosetting adhesive agent, or the like, is preferably applied around the protrusion portion 611 of the connector 5 shown in FIGS. 4 and 5. With the protrusion portion 611 kept in a downwardly-facing state, the leader lines 224 are preferably inserted into the through-holes 61*a* of the pedestal 52 and the hole portions 51*a* of the metal pins 51 and are taken out toward the lower surfaces of the metal pins 51, namely toward the upper side in FIG. 15. FIG. 15 is a schematic sectional view of the connector 5 taken along a plane parallel to the center axis J1 and the extension direction of the connector 5.

Figure 16:
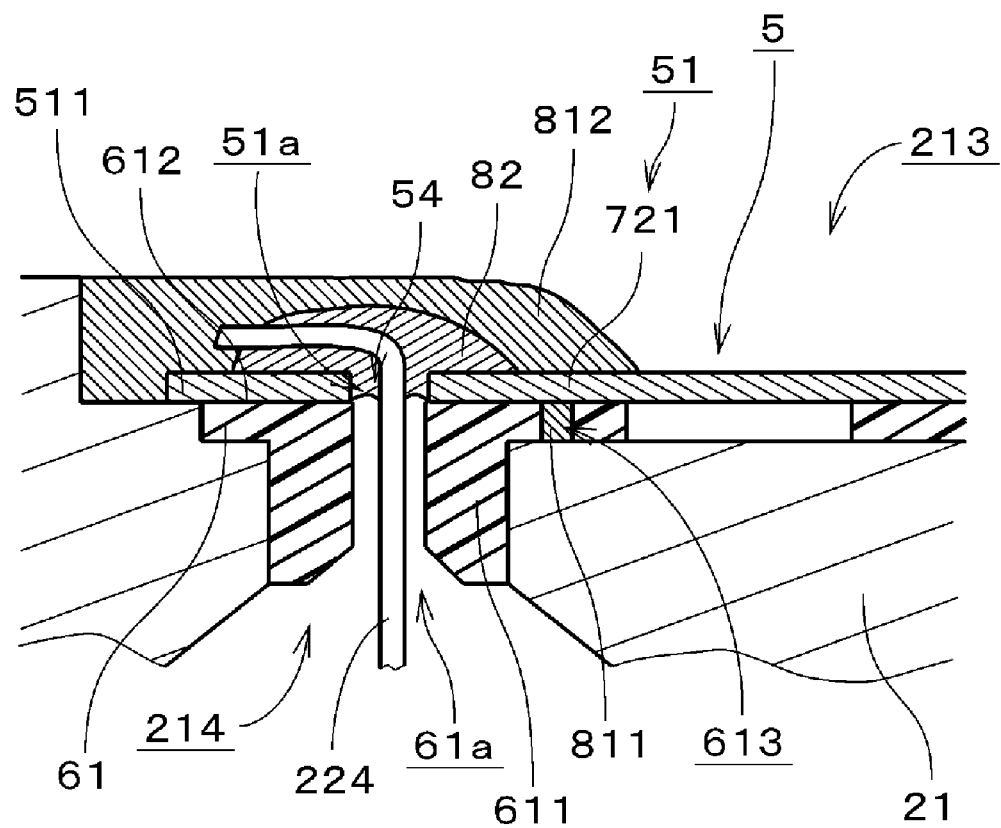
FIG. 16 is another schematic sectional view showing the connector and the base member.

The protrusion portion 611 is preferably press-fitted to the communication hole 214 defined in the recess portion 213 of the base member 21. At this time, the adhesive agent 811 existing around the protrusion portion 611 is preferably spread out between the pedestal 52 and the base member 21. As shown in FIG. 16, a portion of the adhesive agent 811 preferably flows into the sealing through-holes 613. Thus, the sealing through-holes 613 are preferably filled with the adhesive agent 811. In an alternative example of the preferred embodiment, the protrusion portion 611 may not be press-fitted to the communication hole but may be inserted into the communication hole with a gap left therebetween, for example.

In the connector 5, the leader lines 224 preferably are cut to have a specified length, and then soldered to the first connection terminals 511 of the metal pins 51 on the hole-positioning lower surface 612. In the following description, the positions of the hole portions 51*a* in the first connection terminals 511 will be referred to as "connection positions 54" of the leader lines 224 and the first connection terminals 511.

Figure 17:
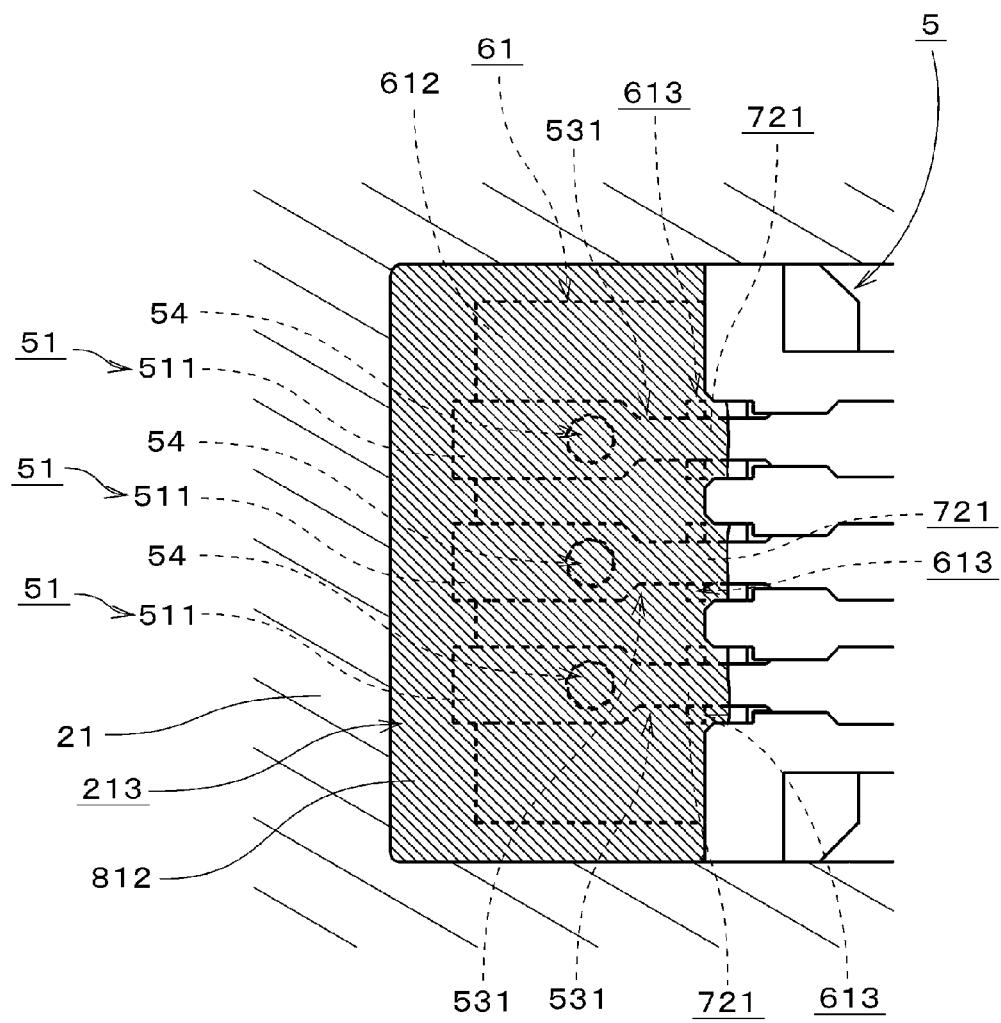
FIG. 17 is a schematic bottom view showing the connector and the base member.

FIG. 17 is a schematic view showing the recess portion 213 of the base member 21 and its vicinities as seen from above in FIG. 16. As shown in FIGS. 16 and 17, a sealing material, e.g., a thermosetting adhesive agent 812, is preferably applied on the connector 5 in the recess portion 213 of the base member 21. In FIG. 17, the adhesive agent 812 is hatched and only the connector 5 in the area covered with the adhesive agent 812 is indicated by dot lines. The hole-defining portion 61, the first connection terminals 511, certain areas of the first reduced width portions 721 and the solders 82 (see FIG. 16) are covered with the adhesive agent 812. Since the solders 82 are preferably arranged in the connection positions 54 of the connector 5 as shown in FIG. 16, the adhesive agent 812 does not exist around the through-holes 61*a* of the protrusion portion 611. The adhesive agents 811 and 812 are thermally cured and thus completing the task of attaching the connector 5 to the base member 21. An ultraviolet curable adhesive agent or an ultraviolet/heat curable adhesive agent may be used as the sealing material, for example.

Figure 18:
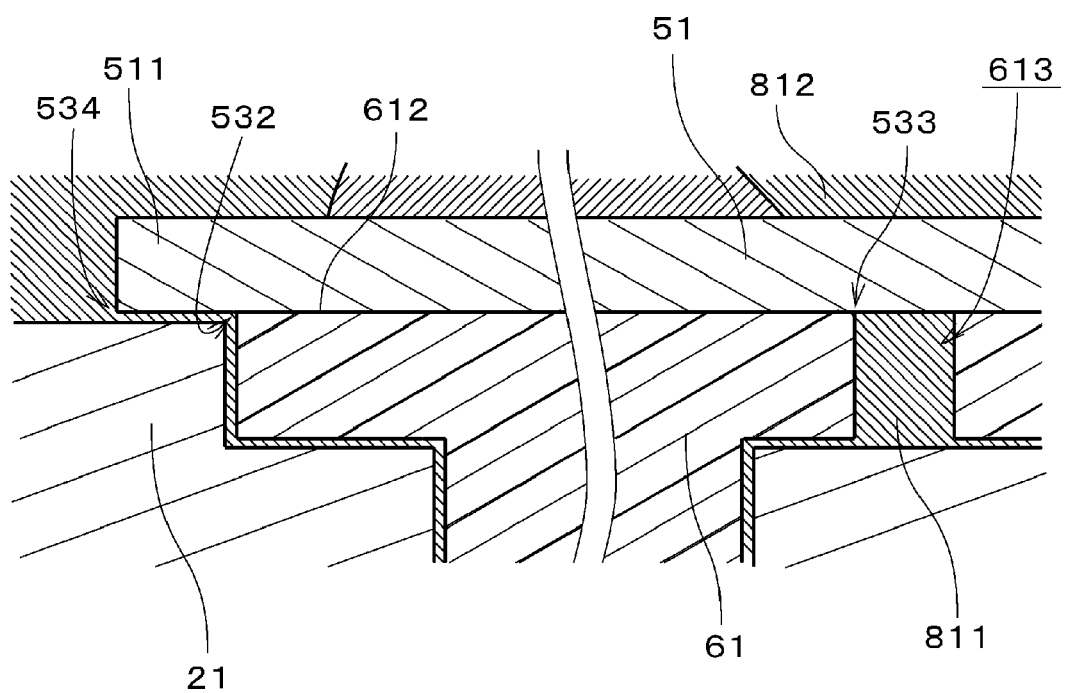
FIG. 18 is a schematic sectional view of the connector.

FIG. 18 is a schematic enlarged view of the surrounding structures of the first connection terminals 511 and the sealing through-holes 613 shown in FIG. 16. The adhesive agent 811 interposed between the hole-defining portion 61 and the lower surface of the base member 21 is preferably spread to the border 532 between the hole-positioning lower surface 612 and the tip end portion of the first connection terminal 511 and to the border 534 between the base member 21 and tip end portion of the first connection terminal 511. The adhesive agent 811 joins the adhesive agent 812 in the border 534. As will be described below, however, the adhesive agent 811 and the adhesive agent 812 are not necessarily joined to each other. In FIG. 18, the thickness of the adhesive agent 811 existing between the first connection terminal 511, the hole-defining portion 61 and the base member 21 is shown on an exaggerated scale.

The adhesive agent 811 exists in the border 533 between the sealing through-holes 613 and the first connection terminals 511 of the metal pins 51, namely in the positions where the edge regions of the upper openings of the sealing through-holes 613 positioned near the first connection terminals 511 in FIG. 18 intersect the metal pins 51. As can be seen in FIG. 17, the width of the sealing through-holes 613 in the transverse direction is preferably greater than the width of the first reduced width portion 721 vertically overlapping with each of the sealing through-holes 613. Therefore, the adhesive agent 812 existing at the opposite lateral sides of the first reduced width portion 721 preferably joins the adhesive agent 811 existing within the sealing through-holes 613 shown in FIG. 18. In the following description, the adhesive agent 811 and the adhesive agent 812 will be collectively referred to as "adhesive agent 81" when there is no need to distinguish them. In the positions where the sealing through-holes 613 are arranged, the periphery of the cross section of each of the metal pins 51 taken along a plane perpendicular to the extension direction of each of the metal pins 51 is surrounded by the adhesive agent 81.

When the connector 5 is seen from below as in FIG. 17, the adhesive agent 812 exists in the opposite lateral areas 531 of the metal pins 51 among the contour of the region where the hole-positioning lower surface 612 of the hole-defining portion 61 overlaps with the upper surfaces of the metal pins 51. As a result, the entire periphery of the region between the first connection terminals 511 and the sealing through-holes 613 where the hole-positioning lower surface 612 overlaps with the upper surfaces of the metal pins 51 is substantially fully sealed with the adhesive agent 81.

Figure 19:
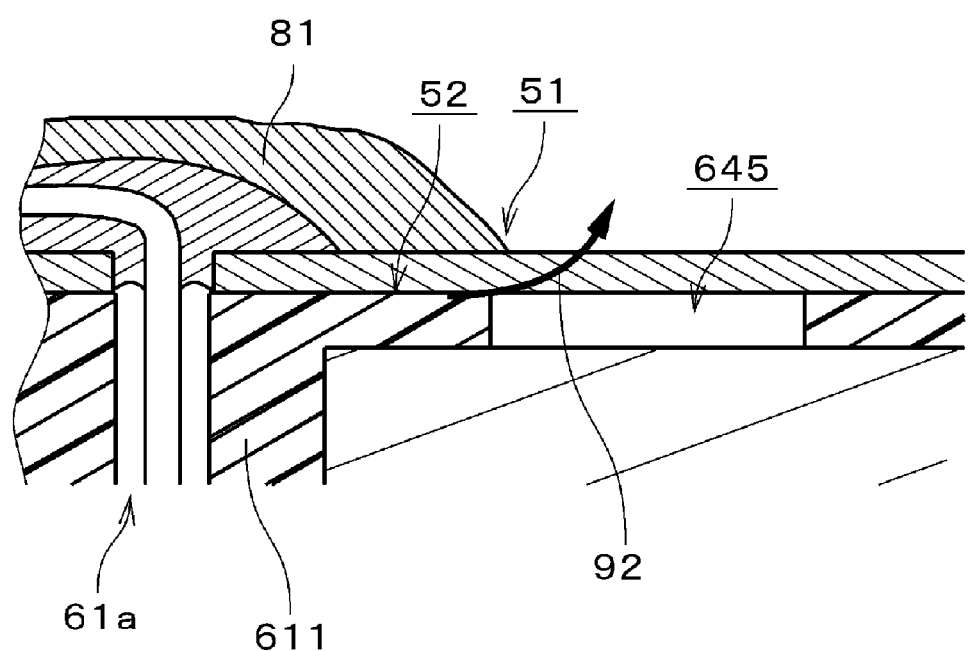
FIG. 19 is schematic another sectional view of the connector.

In a hypothetical case where the sealing through-holes 613 are not defined in the pedestal 52, it is likely that, as illustrated in FIG. 19, the gas existing within the disk drive apparatus 10 may flow from the through-holes 61*a* of the protrusion portion 611 into the propping through-holes 645 through the minute gaps between the metal pins 51 and the pedestal 52. The minute gaps signify the fluid-flowing gaps generated due to the failure of close contact of the metal pins 51 and the pedestal 52. Since the adhesive agent 81 is not applied around the propping through-holes 645, the gas will be leaked to the opposite lateral sides of the metal pins 51, namely to the outside in the direction perpendicular to the paper plane in FIG. 19, as indicated by an arrow 92. Unlike the connector in which metal pins are covered with a resin by injection molding, the gas is likely to flow through the minute gaps in the connector in which the metal pins are inserted into the pedestal. Examples of the gas include, but are not limited to, air and helium.

In the present connector 5, the separation position existing between the first connection terminal 511 and the second connection terminal 512 where each of the metal pins 51 is separated from the pedestal 52, namely the border 533 of each of the metal pins 51 and each of the sealing through-holes 613, is sealed with the adhesive agent 81. Accordingly, a gas will be prevented from flowing through the propping through-holes 645.

With the motor 12 of the first preferred embodiment described above, the entire periphery of the region between the hole-positioning lower surface 612 and the metal pins 51 in the connector 5, namely the entire periphery of each of the connection positions 54, is sealed by the adhesive agent 81.

This prevents a gas from flowing into and out of the disk drive apparatus 10. In the pedestal 52, the sealing through-holes 613 corresponding to the metal pins 51 are preferably arranged above the upper surfaces of the metal pins 51. This makes it easy to seal the periphery of each of the metal pins 51. Sealing is reliably performed because the width of the sealing through-holes 613 in the transverse direction is greater than the width of the first reduced width portion 721 of each of the metal pins 51 overlappingly positioned above each of the sealing through-holes 613. The size of the sealing through-holes 613 is smaller than the size of the propping through-holes 645, 646 and 647. Therefore, as compared with the case where sealing is performed by filling the adhesive agent 81 in the propping through-holes 645, 646 and 647, it is possible to effectively perform the sealing with a small amount of adhesive agent.

In the present connector 5, even if the adhesive agent 811 or 812 fails to flow into the border 532 shown in FIG. 18, the entry of a gas from the first connection terminal 511 will not occur as long as the region between the first connection terminal 511 and the base member 21 is sealed with the adhesive agent 812. In other words, the entry of a gas is prevented in the connector 5 according to the present preferred embodiment if the full periphery of the gap between each of the metal pins 51 and the pedestal 52 over the extent from the first connection terminal 511 to the border 533 where each of the metal pins is separated from the pedestal 52, is substantially sealed with the adhesive agent 81 except the periphery of each of the through-holes 61*a*. This holds true in other preferred embodiments described below.

Figure 20:
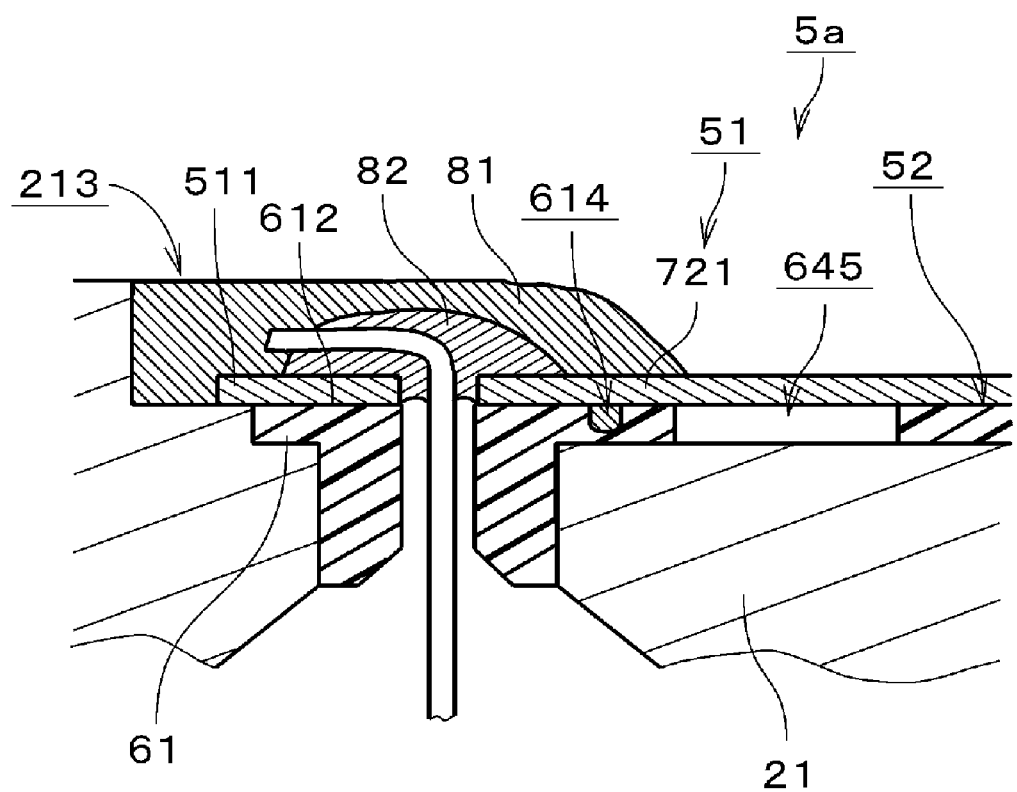
FIG. 20 is a schematic sectional view showing the connector and the base member of a motor according to a second preferred embodiment.
Figure 21:
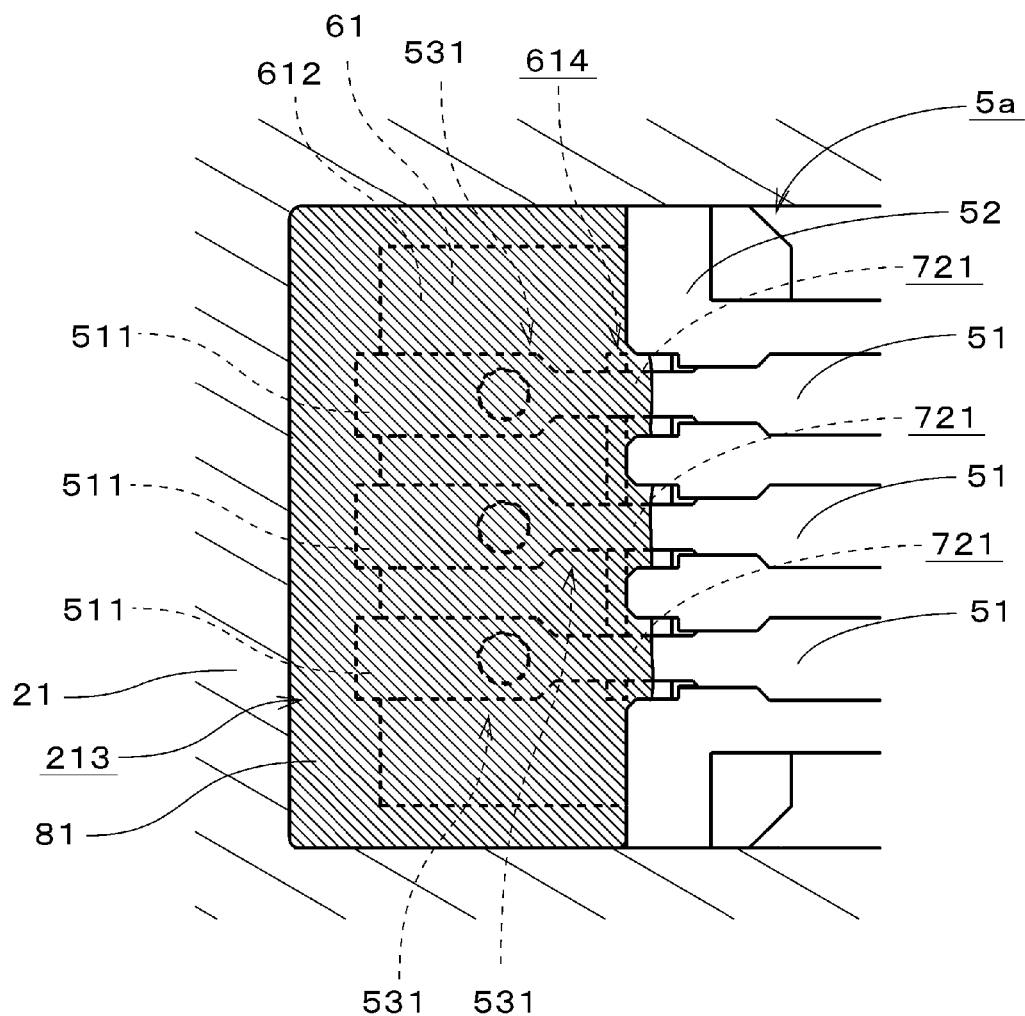
FIG. 21 is a schematic bottom view showing the connector and the base member.

FIG. 20 is a schematic sectional view showing a connector 5*a* and its vicinity in a motor according to a second preferred embodiment. FIG. 21 is a schematic view seen from above in FIG. 20, namely seen from the lower surface of the base member 21. In FIG. 21, the area of the connector 5*a* covered with the adhesive agent 81 is indicated by dot lines. The hole-defining portion 61 of the pedestal does not include the sealing through-holes 613 but preferably includes a sealing groove portion 614 depressed toward the base member 21 away from the upper surfaces of the metal pins 51. The lower side in FIG. 20, at which the base member 21 is preferably arranged, corresponds to the upper side in FIG. 1. In the following description, the groove portion 614 will be referred to as "sealing groove portion 614". Other structures of the connector 5*a* are substantially similar as the structures of the connector 5 of the motor 12 according to the first preferred embodiment. The task of assembling the connector 5*a* and the task of installing the connector 5*a* to the base member 21 are preferably carried out in the similar manner as in the first preferred embodiment. In the following description, the same components will be designated with like reference numerals.

Referring to FIG. 21, the sealing groove portion 614 preferably extends across the first reduced width portions 721 of the three metal pins 51 in the transverse direction. The width of the sealing groove portion 614 in the transverse direction is greater than the width of the first reduced width portion 721 in the same direction. As shown in FIG. 20, the length of the sealing groove portion 614 in the extension direction of the connector 5*a* is smaller than the length of the propping through-holes 645 in the same direction.

If the adhesive agent 811 is further applied into the recess portion 213 in a state that the connector 5*a* is fixed to the recess portion 213 of the base member 21 by means of the adhesive agent 812, the hole-defining portion 61, the first connection terminals 511, partial areas of the first reduced width portions 721 and the solders 82 (see FIG. 20) are preferably covered with the adhesive agent 81. In FIGS. 20 and 21, reference numerals 811 and 812 are omitted and reference numeral 81 alone is used to designate the adhesive agent. This holds true in FIG. 23.

Figure 22:
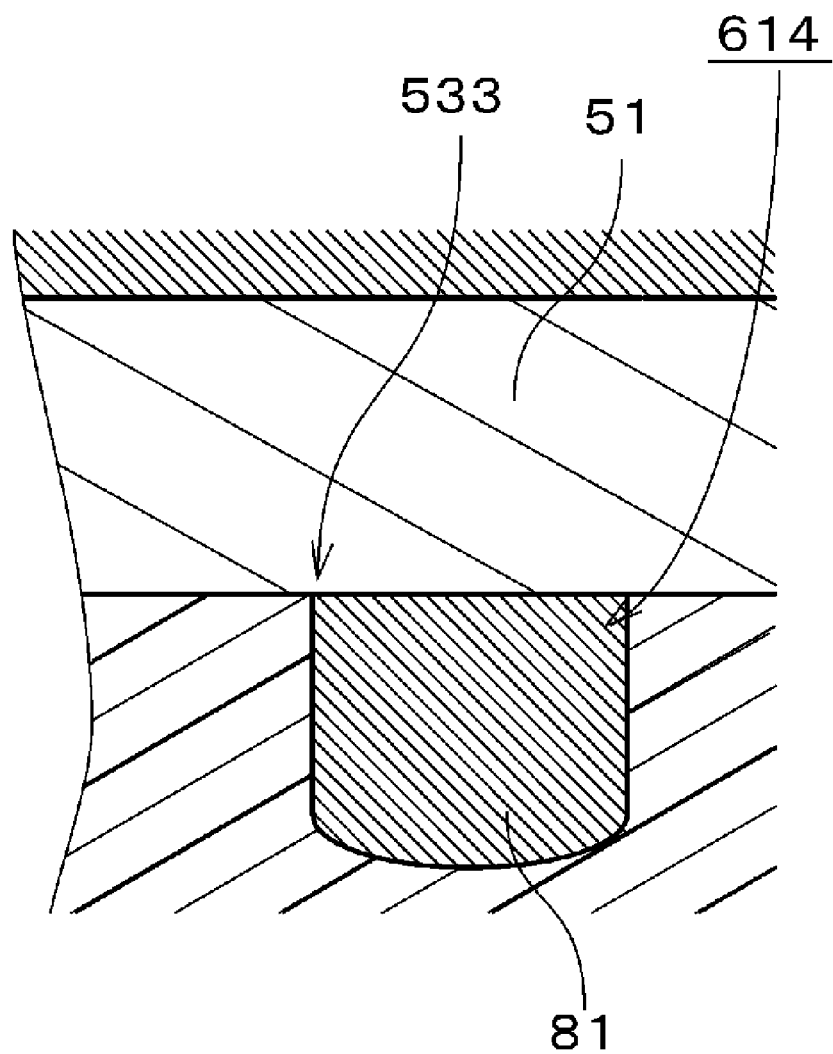
FIG. 22 is a schematic sectional view of the connector.

As is the case in FIG. 18, the adhesive agent 81 preferably exists between the first connection terminals 511, the pedestal 52 and the base member 21. In the connector 5*a*, the adhesive agent 81 flows into the sealing groove portion 614 as shown in FIG. 22, thereby filling the sealing groove portion 614 with the adhesive agent 81. Accordingly, the intersection positions where the edge regions of the sealing groove portion 614 adjacent to the first connection terminals 511 intersect the metal pins 51, namely the borders 533 between the sealing groove portion 614 and the first connection terminals 511 of the metal pins 51, are preferably sealed by the adhesive agent 81.

When the connector 5*a* is seen from below, the adhesive agent 81 preferably exists in the opposite lateral areas 531 of the metal pins 51 among the contour of the region where the hole-positioning lower surface 612 of the hole-defining portion 61 overlaps with the upper surfaces of the metal pins 51. As a result, the entire periphery of the region between the first connection terminals 511 and the sealing groove portion 614 where the hole-positioning lower surface 612 overlaps with the upper surfaces of the metal pins 51 is preferably fully sealed with the adhesive agent 81.

With the motor of the second preferred embodiment described above, the entire periphery of each of the connection positions 54 is preferably sealed by the adhesive agent 81. This prevents a gas from flowing into and out of the disk drive apparatus 10. The separation position existing between the first connection terminal 511 and the second connection terminal 512 where each of the metal pins 51 is separated from the pedestal 52, namely the border 533 of each of the metal pins 51 and the sealing groove portion 614, is sealed with the adhesive agent 81. This makes it easy to seal the areas of the connection positions 54 adjacent to the second connection terminals 512. Since the sealing groove portion 614 has a reduced size, it is possible to effectively perform the sealing with a small amount of adhesive agent 81.

Figure 23:
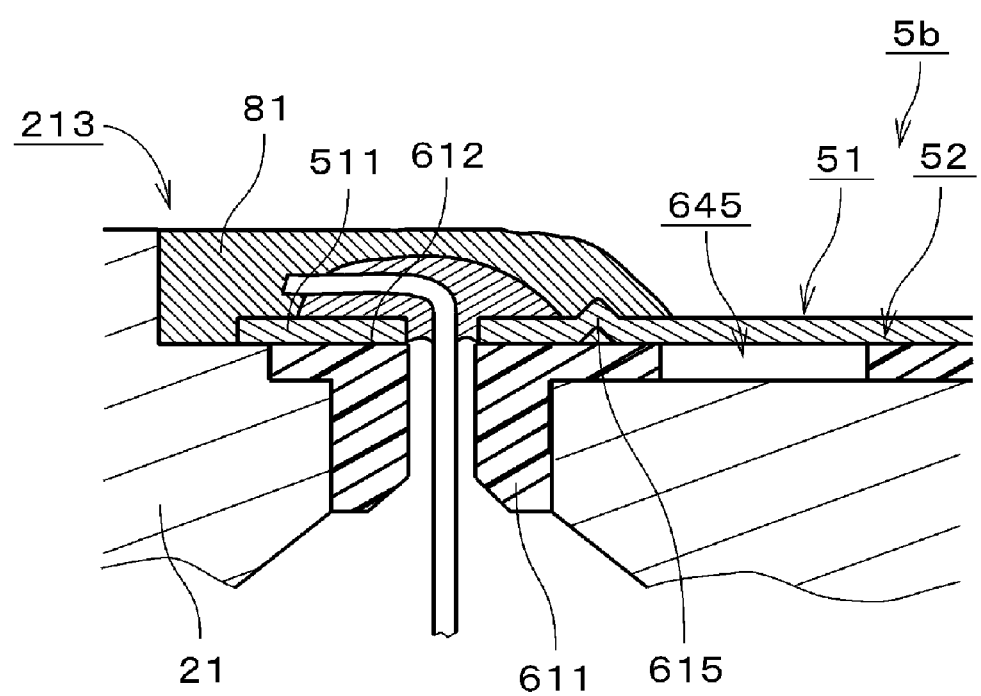
FIG. 23 is a schematic sectional view showing a connector according to another example.

FIG. 23 is a view showing another example of the connector. Each of the metal pins 51 of a connector 5*b* preferably includes a sealing curve portion 615 positioned between the protrusion portion 611 of the pedestal 52 and the propping through-hole 645 and curved to protrude away from the pedestal 52. Other structures of the connector 5*b* are substantially similar as the structures of the connector 5 of the first preferred embodiment. If the adhesive agent 811 is further applied into the recess portion 213 in a state that the connector 5*b* is fixed to the recess portion 213 of the base member 21 by means of the adhesive agent 812, the adhesive agent 81 preferably flows into between the sealing curve portion 615 and the hole-positioning lower surface 612 of the pedestal 52. Consequently, the border between the area of the sealing curve portion 615 adjacent to the first connection terminal 511 and the hole-positioning lower surface 612 is sealed by the adhesive agent 81. This prevents a gas from flowing into and out of the disk drive apparatus 10 through the gap between each of the metal pins 51 and the pedestal 52 and through the propping through-hole 645.

As described above, each of the connectors 5, 5*a* and 5*b* preferably includes a separation position between the first connection terminal 511 and the second connection terminal 512 where each of the metal pins 51 is separated from the pedestal 52. In the extent from the first connection terminal 511 to the separation position, the entire periphery of the region between each of the metal pins 51 and the pedestal 52 is preferably covered with the adhesive agent 81. As a consequence, the periphery of the minute gap between each of the metal pins 51 and the pedestal 52 is preferably sealed with the adhesive agent 81. This prevents a gas from flowing into and out of the disk drive apparatus 10 through the through-holes 61a of the protrusion portion 611.

Figure 24:
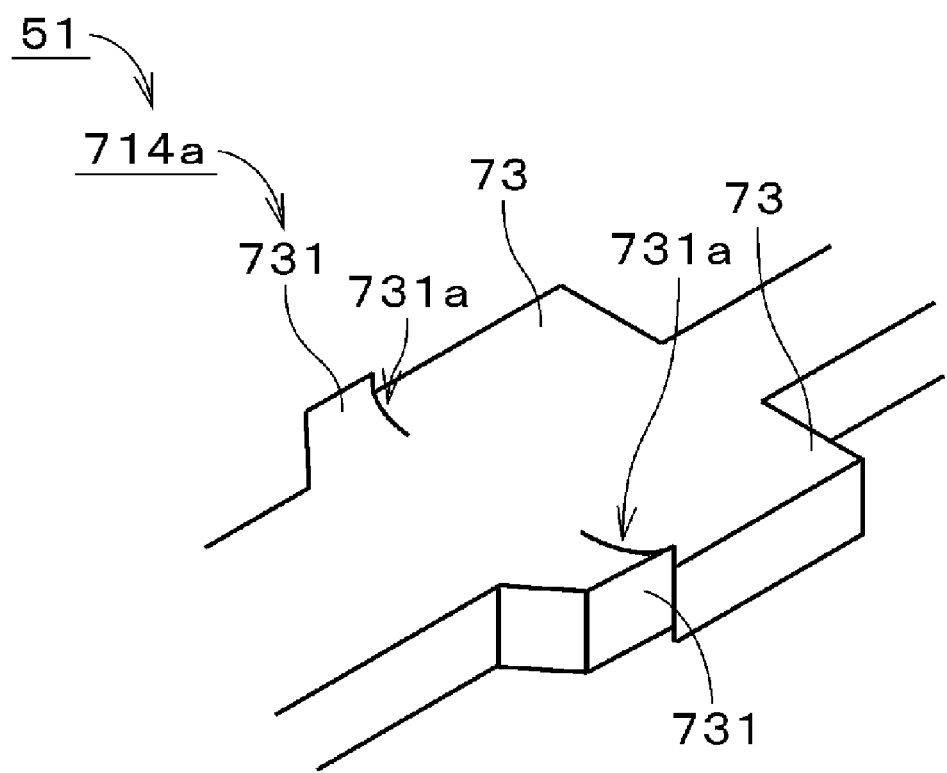
FIG. 24 is a schematic perspective view showing another example of the metal pin.
Figure 25:
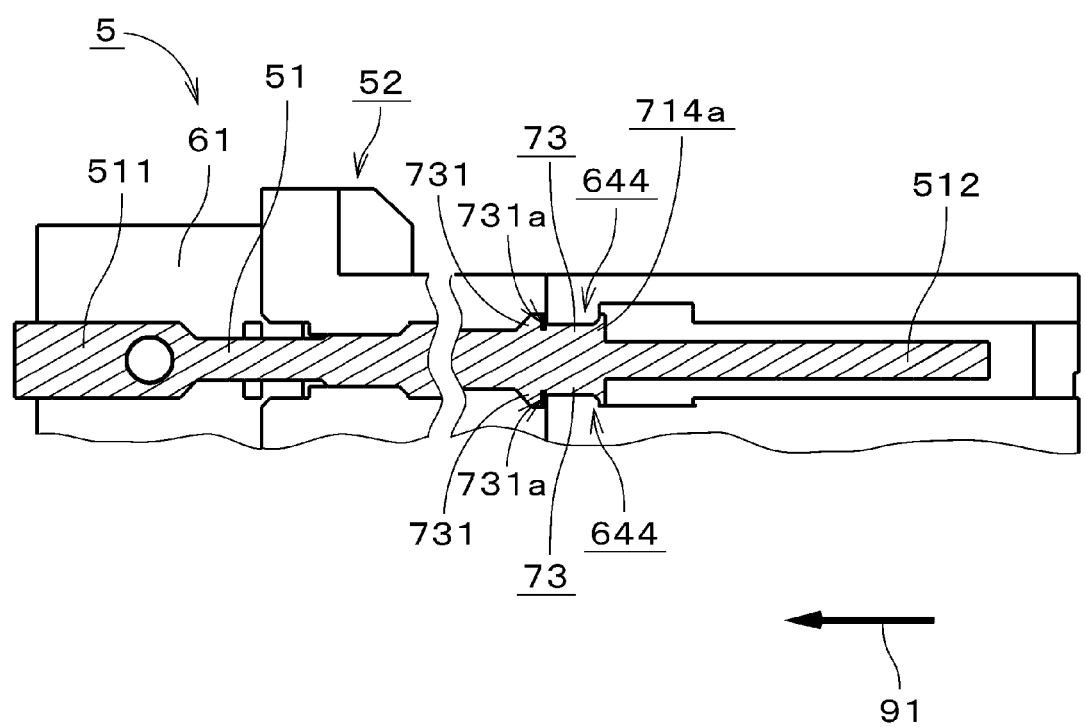
FIG. 25 is a schematic bottom view of the connector.

FIG. 24 is a schematic perspective view showing another example of the metal pins 51. In FIG. 24, one of the metal pins 51 is shown with the lower surface thereof facing upwards. FIG. 25 is a schematic bottom view of the connector 5. Each of the metal pins 51 preferably includes inwardly-extending notches 731a defined in the lateral portions 73, i.e., the transverse opposite areas, of the fourth increased width portion 714a. The regions 731 of the lateral portions 73 nearer to the first connection terminal 511 than the notches 731a are preferably bent upwards in FIG. 24, namely forwards from the paper plane in FIG. 25. In the following description, the regions 731 will be referred to as "hook portions 731". As shown in FIG. 25, the hook portions 731 preferably make contact with or adjoin to the ends of the fourth prop portions 644 positioned at the side of the hole-defining portion 61.

When attaching the metal pins 51 to the pedestal 52, each of the metal pins 51 is preferably inserted into the pedestal 52 such that the first through fourth reduced width portions 721, 722, 723 and 724 can be positioned inside the first through fourth prop portions 641, 642, 643 and 644 of the pedestal 52 as shown in FIG. 13. Then, each of the metal pins 51 is caused to slide in the direction from the second connection terminal 512 toward the first connection terminal 511 (hereinafter referred to as "attachment direction") as indicated by an arrow 91 in FIG. 13.

Figure 26:
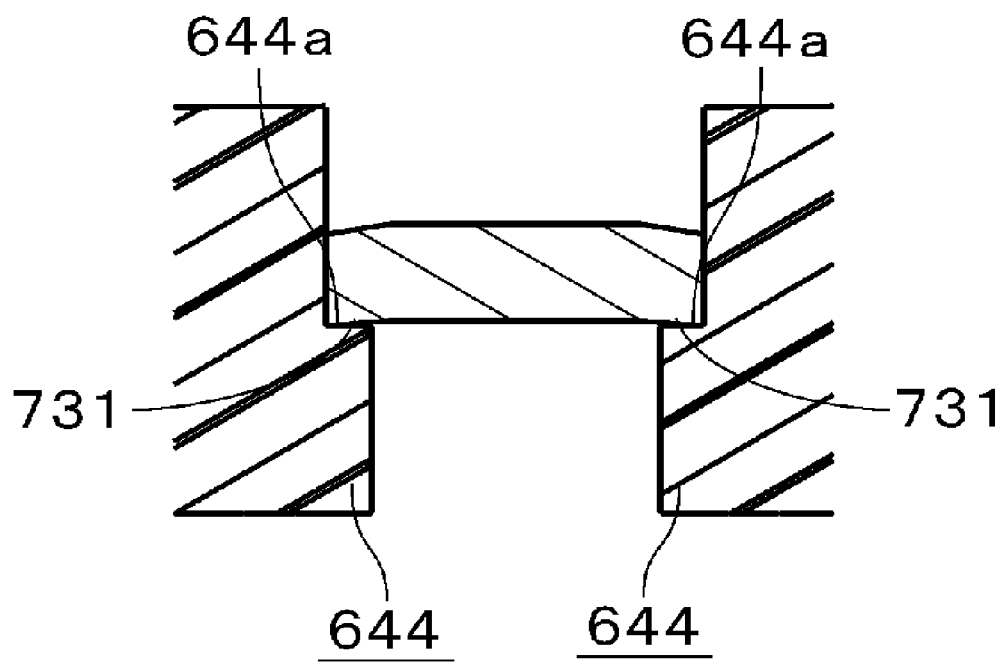
FIG. 26 is a schematic sectional view showing the connector under an assembling process.

At this time, as shown in FIG. 26, the hook portions 731 preferably make contact with the upper surfaces 644a of the fourth prop portions 644 and undergo elastic deformation so that they can be pushed upwards. If the hook portions 731 are moved toward the hole-defining portion 61 beyond the fourth prop portions 644 as shown in FIG. 25, they come back to the original shape. As a consequence, the hook portions 731 make contact with or adjoin to the fourth prop portions 644. The hook portions 731 need not to completely come back to the original shape. This holds true in case of the hook portions of the metal pins 51 shown in FIG. 27. The movement of each of the metal pins 51 is stopped as the step portion 513 of each of the metal pins 51 comes into contact with the step portion 523 of the pedestal 52 as shown in FIG. 9.

In the present connector 5, even when a force acting in the opposite direction to the attachment direction is applied to each of the metal pins 51, the hook portions 731 come into contact with the fourth prop portions 644, thereby holding each of the metal pins 51 against movement in the opposite direction to the attachment direction. The fourth prop portions 644 and the hook portions 731 provide a so called snap-fit structure in which the hook portions 731 play a role of stoppers. This makes it possible to effectively prevent positional deviation of the metal pins 51 with respect to the pedestal 52. As a result, it is possible to prevent bad connection of the first connection terminals 511 of the metal pins 51 and the leader lines 224 of the stator 22, which would otherwise occur when the leader lines 224 are soldered to the first connection terminals 511.

In the present connector 5, the thickness of the fourth prop portions 644 may be reduced so that the fourth prop portions 644 can be elastically deformed and pressed downwards when the metal pins 51 are attached to the pedestal 52. Alternatively, only the fourth prop portions 644 may undergo elastic deformation. This holds true in the connector 5 shown in FIG. 28.

Figure 27:
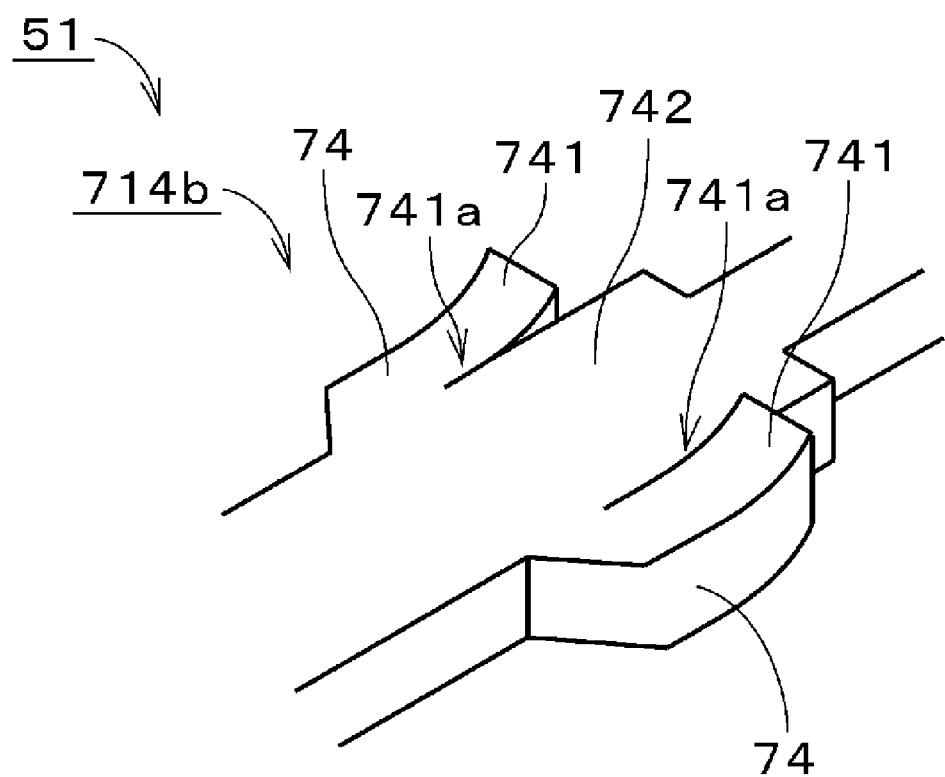
FIG. 27 is a schematic perspective view showing a further example of the metal pin.
Figure 28:
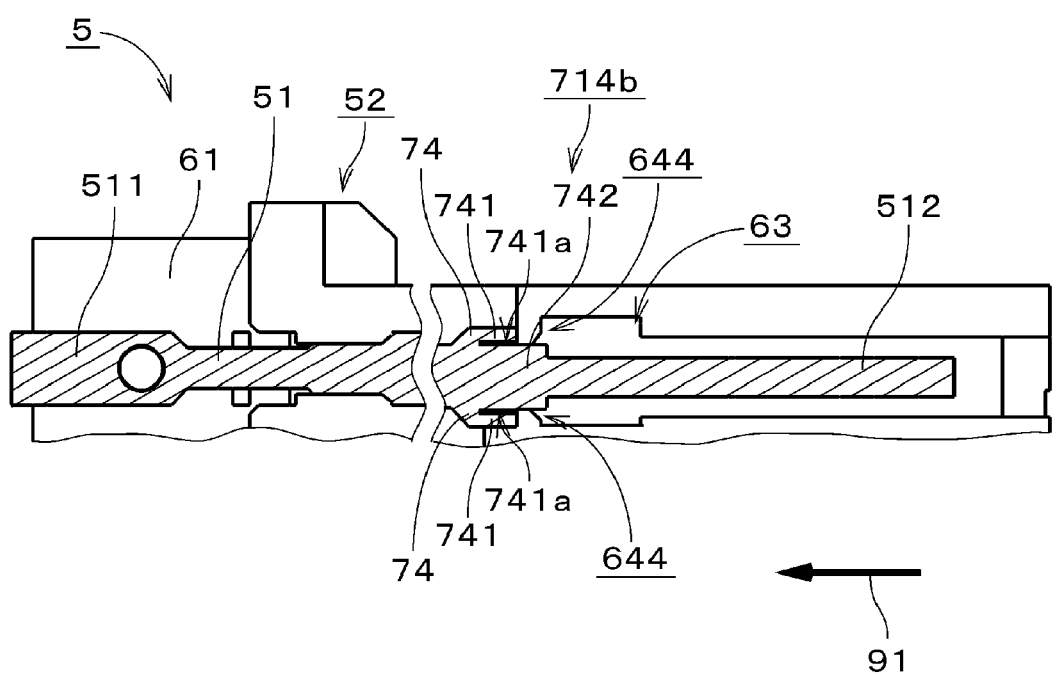
FIG. 28 is a schematic bottom view of the connector.

FIG. 27 is a schematic perspective view showing a further example of the metal pins 51. In FIG. 27, one of the metal pins 51 is shown with the lower surface thereof facing upwards. FIG. 28 is a schematic bottom view of the connector 5. The fourth increased width portion 714b of each of the metal pins 51 preferably includes notches 741a defined between the right upper regions 741 of the lateral portions 74 in FIG. 27, namely the regions 741 of the lateral portions 74 nearer to the second connection terminal 512 in FIG. 28, and the central portion 742 lying inwards of the lateral portions 74. The notches 741a are arranged substantially parallel to the extension direction of the metal pins 51. The regions 741 preferably extend along the extension direction of the metal pins 51 and are bent upwards in FIG. 27, namely forwards from the paper plane in FIG. 28. In the following description, the regions 741 will be referred to as "hook portions 741".

When attaching the metal pins 51 to the pedestal 52, the hook portions 741 shown in FIG. 28 are placed within the slit 63 positioned at the right side of the fourth prop portions 644. Then, as indicated by an arrow 91, each of the metal pins 51 is preferably caused to slide in the attachment direction parallel to the extension direction of the metal pins 51. At this time, the hook portions 741 preferably make contact with the upper surfaces 644a of the fourth prop portions 644 as is the case in FIG. 26. Consequently, the hook portions 741 are elastically deformed such that they can be pushed upwards. If the hook portions 741 are moved to the hole-defining portion 61 beyond the fourth prop portions 644 as illustrated in FIG. 28, they come back to the original shape and make contact with or adjoin to the fourth prop portions 644.

In the present connector 5, the fourth prop portions 644 and the hook portions 741 provide a so called snap-fit structure by which the metal pins 51 are held against movement in the opposite direction to the attachment direction. This makes it possible to reliably prevent positional deviation of the metal pins 51 with respect to the pedestal 52. As a result, it is possible to prevent bad connection of the first connection terminals 511 and the leader lines 224, which would otherwise occur when the leader lines 224 are soldered to the first connection terminals 511.

Figure 29:
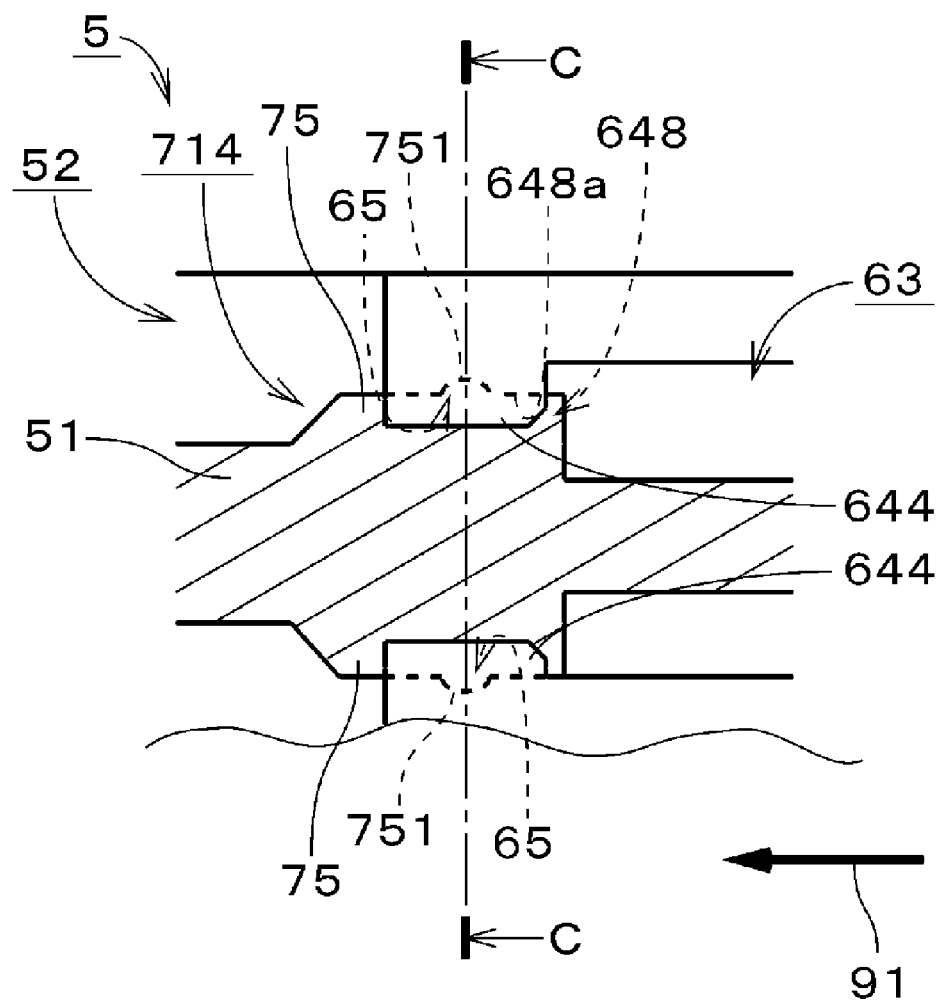
FIG. 29 is a schematic bottom view showing a connector according to a further example.
Figure 30:
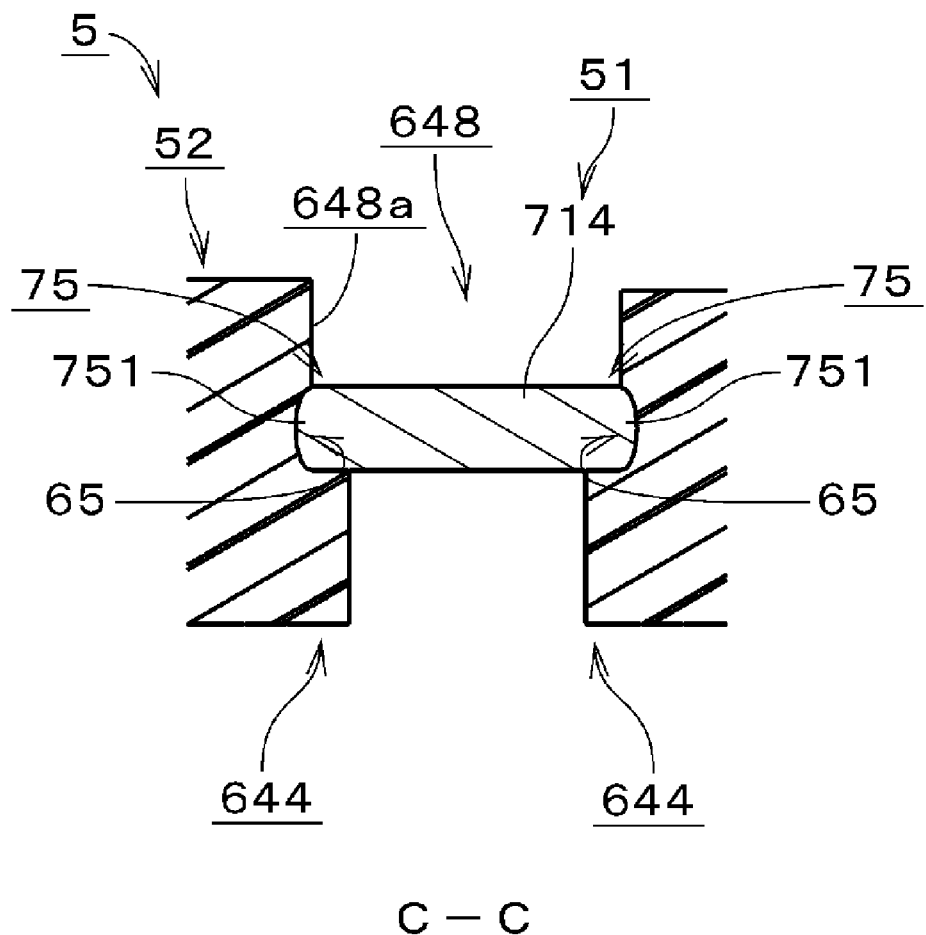
FIG. 30 is a schematic sectional view of the connector.

FIG. 29 is a schematic bottom view of the connector 5 including the metal pins 51 according to a still further example. FIG. 30 is a schematic sectional view of the connector 5 taken along line C-C in FIG. 29. The fourth increased width portion 714 of each of the metal pins 51 preferably includes minute protrusions 751 formed in the lateral portions 75 thereof. As can be seen in FIG. 30, the inner surfaces 648a of the propping through-hole 648 preferably include two minute groove portions 65 defined at the transverse opposite sides. The groove portions 65 are preferably positioned above the fourth prop portions 644 to engage with the protrusions 751 formed in the lateral portions 75.

When attaching the metal pins 51 to the pedestal 52, the fourth increased width portion 714 shown in FIG. 29 is placed within the slit 63 positioned at the right side of the fourth prop portions 644. Then, as indicated by an arrow 91, each of the metal pins 51 is caused to slide in the attachment direction. At this time, the inner surfaces 648a of the propping through-hole 648 are elastically deformed a little bit by the protrusions 751 of the fourth increased width portion 714 so that they can be expanded in the transverse direction. If the protrusions 751 are moved into the groove portions 65, the inner surfaces 648a of the propping through-hole 648 come back to the original shape. Thus, the protrusions 751 engage with the groove portions 65. The inner surfaces 648a need not to completely come back to the original shape.

In the present connector 5, the protrusions 751 and the groove portions 65 provide a so called snap-fit structure by which the metal pins 51 are held against movement in the opposite direction to the attachment direction.

Figure 31:
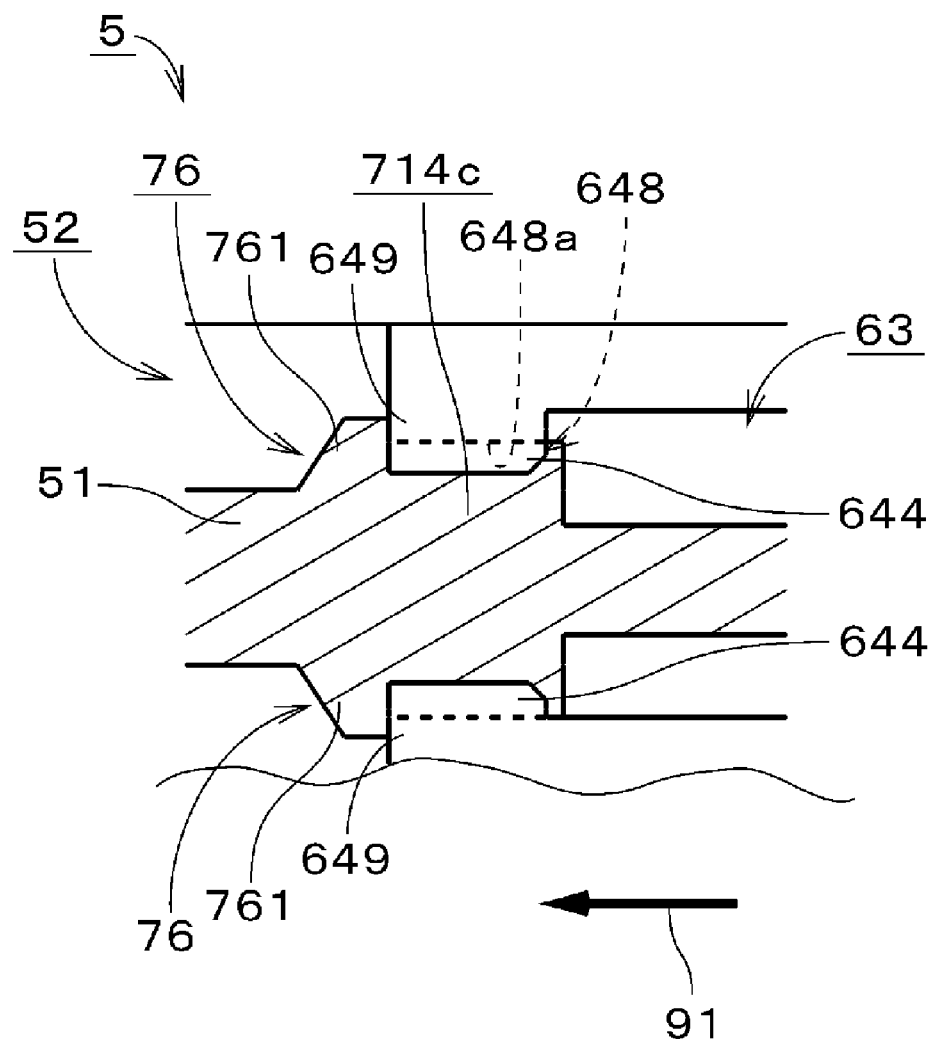
FIG. 31 is a schematic bottom view showing a connector according to a still further example.

FIG. 31 is a schematic bottom view of the connector 5 including the metal pins 51 according to a yet still further example. In the lateral portions 76 of the fourth increased width portion 714c, the front regions 761 in the attachment direction indicated by an arrow 91 protrude farther in the transverse direction than other regions. In the following description, the regions 761 will be referred to as "front portions 761". When attaching the metal pins 51 to the pedestal 52, each of the metal pins 51 is preferably caused to slide toward the fourth prop portions 644 in the attachment direction in a state that the fourth increased width portion 714c is positioned within the slit 63. At this time, the front portions 761 preferably make contact with the inner surfaces 648a of the propping through-hole 648. Thus, the inner surfaces 648a are elastically deformed a little bit so that they can be expanded in the transverse direction. If the front portions 761 are moved to the front side of the fourth prop portions 644 in the attachment direction, the inner surfaces 648a come back to the original shape. However, the inner surfaces 648a need not to completely come back to the original shape. The front portions 761 preferably make contact with or adjoin to the regions 649 positioned outwards of the fourth prop portions 644 in the transverse direction. In the present connector 5, the front portions 761 and the regions 649 provide a so called snap-fit structure by which the metal pins 51 are held against movement in the opposite direction to the attachment direction. This makes it possible to prevent positional deviation of the metal pins 51 with respect to the pedestal 52.

While preferred embodiments of the present invention have been described above, the present invention is not limited to these embodiments but may be modified in many different forms. Although the protrusion portion 611 of the connector 5, 5a or 5b includes three through-holes 61a, the number of the through-holes 61a may be other than three. In the foregoing preferred embodiments, the connector may be formed by mating a plurality of pedestals with a plurality of metal pins, for example.

In the foregoing preferred embodiments, a thermosetting adhesive agent may be applied around the communication hole of the recess portion of the base member and, then, the protrusion portion may be inserted into the communication hole.

In the foregoing preferred embodiments, the connector is first fixed to the base member and then the leader lines are taken out to the lower surfaces of the metal pins through the through-holes of the pedestal and the hole portions of the metal pins.

In the metal pins 51 shown in FIG. 24, the hook portions 731 may be bent downwards in FIG. 24. In this case, the pedestal 52 includes a recess portion or a hole portion defined on the surface that makes contact with the upper surfaces of the metal pins 51. A so called snap-fit structure is preferably provided between the hook portions 731 and the recess portion or the hole portion. In the metal pins 51 shown in FIG. 27, the hook portions 741 may be bent downwards. Each of the metal pins 51 shown in FIG. 29 may include protrusions formed on the lower surface of the fourth increased width portion 714, and the fourth prop portions 644 may include groove portions arranged on the upper surfaces thereof to engage with the protrusions. Alternatively, the protrusions may be formed on the upper surface of the fourth increased width portion 714, and the groove portions engaging with the protrusions may be arranged on the surface of the pedestal 52 that makes contact with the fourth increased width portion 714, for example.

In this manner, a wide variety of so called snap-fit structures may be provided in the connector. In usual cases, one of the metal pins 51 and the pedestal 52 includes an elastically deformable portion. When attaching the metal pins 51 to the pedestal 52, the elastically deformable portion is first elastically deformed and then returned back to the original shape such that it can make contact with or adjoin to the other member in the attachment direction. Even if a force acting in the direction opposite to the attachment direction is applied to the metal pins 51, the elastically deformable portion comes into contact with the other member, thereby holding the metal pins 51 against movement in the opposite direction to the attachment direction. In this way, a so called snap-fit structure is provided between the elastically deformable portion and the other member. Alternatively, two elastically deformable portions may be formed in the metal pins 51 and the pedestal 52, for example.

In the connectors of the foregoing preferred embodiments, the metal pins 51 may be vertically press-fitted and fixed to the groove portions which are formed in the extension direction of the pedestal 52, for example. In this type of connector, the entry of a gas can be prevented by defining, for example, the sealing through-holes 613 or the sealing groove portion 614 in the pedestal 52 and filling the adhesive agent 81 into between the pedestal 52 and the metal pins 51. In the disk drive apparatus 10, a bracket-type base member may be attached to the housing member as a portion of the housing 14, for example.

While preferred embodiments of the present invention and certain modified examples thereof have been described above, the present invention is not limited thereto but may be changed or modified in many different forms without departing from the scope and spirit of the invention.

What is claimed is:

1. A spindle motor for use in a disk drive apparatus, comprising:
    a rotary unit including rotor magnets;
    a bearing mechanism arranged to rotatably support the rotary unit about a vertically-extending center axis;
    a stator arranged opposing to the rotor magnets;
    a base member positioned below the stator; and
    a connector fixed to a lower surface of the base member and connected to a leader line extending from the stator through a communication hole of the base member, wherein
    the connector includes a resin-made pedestal fixed to the lower surface of the base member and a metal pin attached to the pedestal,
    the pedestal includes a hole-defining portion with at least one through-hole into which the leader line is inserted, the hole-defining portion including a hole-positioning lower surface and the leader line being connected to a first pin terminal of the metal pin on the hole-positioning lower surface,
    an upper surface of the metal pin is separated from the pedestal at a separation position between the first pin terminal and a second pin terminal of the metal pin, and
    a connection position of the first pin terminal and the leader line on the hole-positioning lower surface is covered with an adhesive agent, the periphery of a gap defined between the metal pin and the pedestal over an extent from the first pin terminal to the separation position being sealed by the adhesive agent except for the periphery of the through-hole of the hole-defining portion.

2. The spindle motor of claim 1, wherein the pedestal includes a groove portion depressed upwards away from the upper surface of the metal pin between the first pin terminal and the second pin terminal, the separation position being a position where the metal pin intersects the edge regions of the groove portion positioned near the first pin terminal.

3. The spindle motor of claim 1, wherein the pedestal includes a sealing through-hole defined above the upper surface of the metal pin between the first pin terminal and the second pin terminal, the separation position being a position where the metal pin intersects the edge region of an opening of the sealing through-hole positioned near the first pin terminal.

4. The spindle motor of claim 3, wherein the width of the sealing through-hole in a direction perpendicular to the extension direction of the metal pin and parallel to the lower surface of the base member is greater than the width of the metal pin in a position where the metal pin overlaps with the sealing through-hole.

5. The spindle motor of claim 4, wherein the pedestal includes a prop portion positioned nearer to the second pin terminal than the sealing through-hole to prevent the metal pin from moving downwards and a propping through-hole defined above the prop portion.

6. The spindle motor of claim 5, wherein the length of the sealing through-hole in the extension direction of the metal pin is smaller than the length of the propping through-hole.

7. The spindle motor of claim 3, wherein the pedestal includes a prop portion positioned nearer to the second pin terminal than the sealing through-hole to prevent the metal pin from moving downwards and a propping through-hole defined above the prop portion.

8. The spindle motor of claim 7, wherein the length of the sealing through-hole in the extension direction of the metal pin is smaller than the length of the propping through-hole.

9. The spindle motor of claim 3, wherein an adhesive agent is interposed between the connector and the lower surface of the base member to join the adhesive agent covering the connection position.

10. The spindle motor of claim 1, wherein the metal pin is attached to the pedestal in an attachment direction parallel to the extension direction of the metal pin, the metal pin and the pedestal providing a snap-fit structure therebetween to hold the metal pin against movement in the opposite direction to the attachment direction.

11. A disk drive apparatus, comprising:
the spindle motor of claim 1 arranged to rotate a disk;
an access unit arranged to perform at least one of information reading and writing tasks with respect to the disk; and
a housing arranged to accommodate the spindle motor and the access unit, the base member of the spindle motor forming a portion of the housing.

12. A disk drive apparatus, comprising:
the spindle motor of claim 10 arranged to rotate a disk;
an access unit arranged to perform at least one of information reading and writing tasks with respect to the disk; and
a housing arranged to accommodate the spindle motor and the access unit, the base member of the spindle motor forming a portion of the housing.

* * * * *